United States Patent [19]

Deguchi et al.

[11] Patent Number: 6,061,526
[45] Date of Patent: May 9, 2000

[54] IMAGE RECORDING APPARATUS ADJUSTMENT METHOD

[75] Inventors: Takashi Deguchi; Tuyosi Hattori, both of Hino, Japan

[73] Assignee: Konica Corporation, Tokyo, Japan

[21] Appl. No.: 09/246,854

[22] Filed: Feb. 9, 1999

[30] Foreign Application Priority Data

Feb. 10, 1998 [JP] Japan .................................. 10-044316

[51] Int. Cl.[7] ........................... G03B 13/18; G03B 13/32; G03B 3/00
[52] U.S. Cl. ................................. 396/89; 396/95
[58] Field of Search ......................................... 396/89, 95

[56] References Cited

U.S. PATENT DOCUMENTS 4,969,003  11/1990  Ohnuki et al. ............................ 396/95

Primary Examiner—Russell Adams
Attorney, Agent, or Firm—Finnegan, Henderson, Farabow, Garrett & Dunner, L.L.P.

[57] ABSTRACT

A method of adjusting an image recording apparatus includes a step of adjusting at least one of a focus point position of an exposure means, a degree of parallelization of the exposure means and a position of the exposure means, and a step of correcting a light amount of the exposure means after the adjusting step.

7 Claims, 27 Drawing Sheets

FIG. 6

| BIT | RED COLOR 130a ($\mu$sec) | GREEN COLOR 130a ($\mu$sec) | BLUE COLOR 130a ($\mu$sec) |
|---|---|---|---|
| MSB | 230.0 | 614.4 | 614.4 |
| 2ND BIT | 120.0 | 307.2 | 307.2 |
| 3RD BIT | 53.2 | 153.6 | 153.6 |
| 4TH BIT | 26.2 | 76.8 | 76.8 |
| 5TH BIT | 13.0 | 38.4 | 38.4 |
| 6TH BIT | 6.6 | 19.2 | 19.2 |
| 7TH BIT | 3.4 | 9.6 | 9.6 |
| 8TH BIT | 1.8 | 4.8 | 4.8 |
| 9TH BIT | 1.0 | 2.4 | 2.4 |
| 10TH BIT | 0.6 | 1.2 | 1.2 |
| 11TH BIT | 0.4 | 0.6 | 0.6 |
| LSB | 0.3 | 0.3 | 0.3 |

FIG. 22

EXAMPLE OF OUTPUT STANDARD IMAGE
(EXPOSURE TIMING ADJUSTMENT)
<ACTUAL OUTPUT IMAGE>

(1) TO BRING TWO LINES TOGETHER WITH REFERENCE G

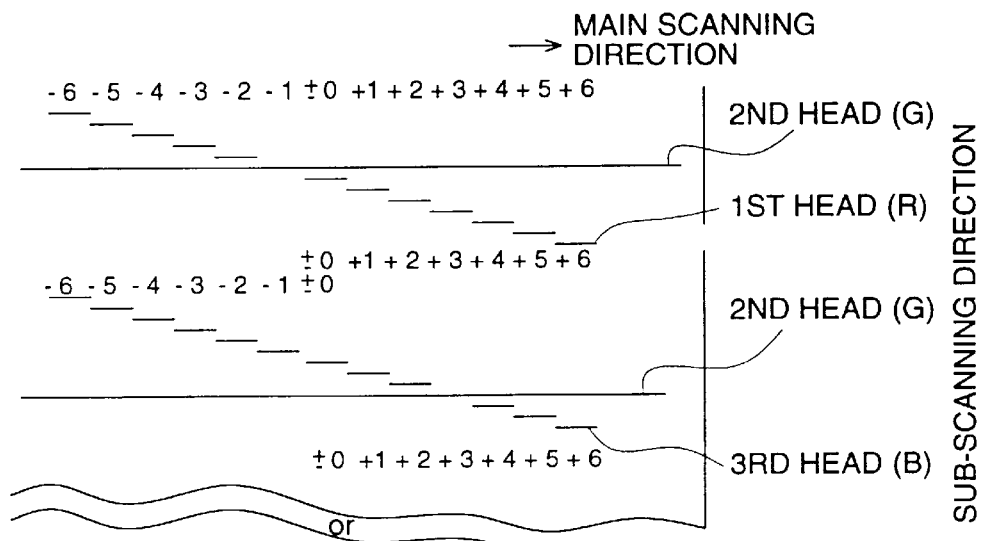

(2) TO BRING 3 COLORS SIMULTANEOUSLY
    WITH REFERENCE R

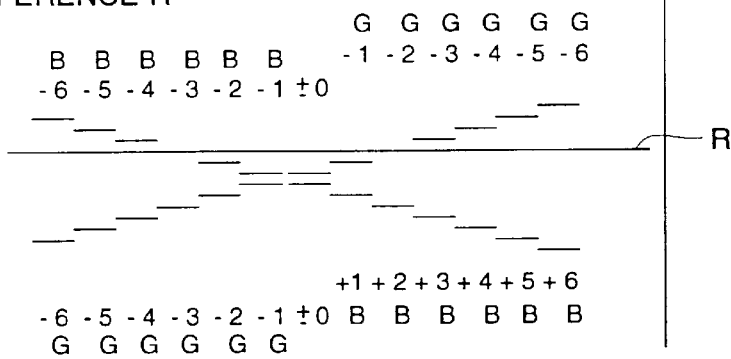

2-COLOR (3-COLOR) LINES MAY BE OVERLAPPED TOTALLY,
OR THEY MAY BE OVERLAPPED PARTIALLY, OR THEY MAY BE
ADJACENT TO EACH OTHER WITHOUT BEING OVERLAPPED,
IN PROXIMITY AREA.

(COMMON FOR BOTH MAIN SCANNING AND SUB-SCANNING)

(COMMON FOR BOTH MAIN SCANNING AND SUB-SCANNING)

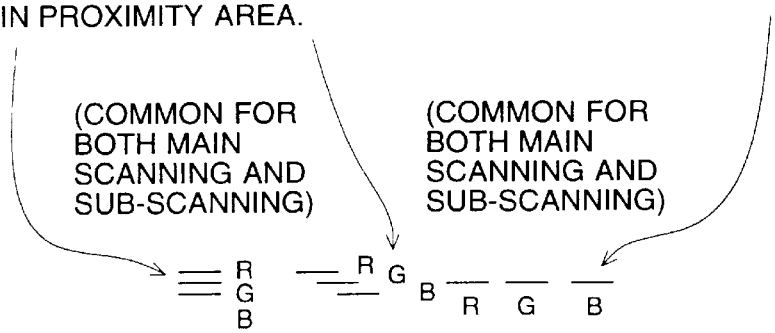

FIG. 26
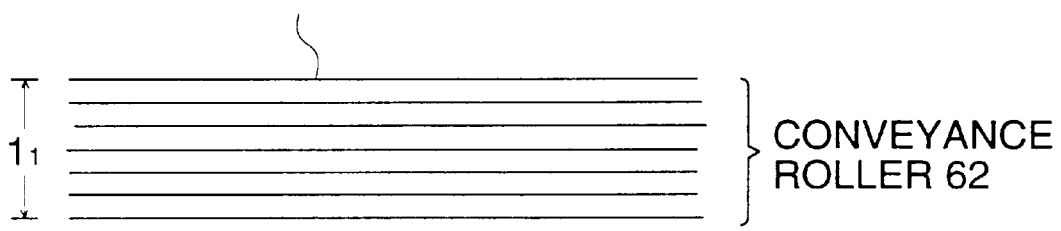
NUMBER OF $1_1$/ IMAGE LINES = ratio 62
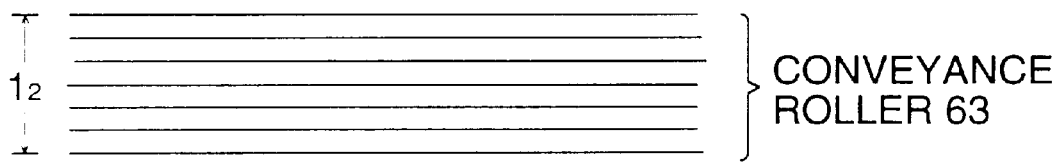
NUMBER OF $1_2$/ IMAGE LINES = ratio 63
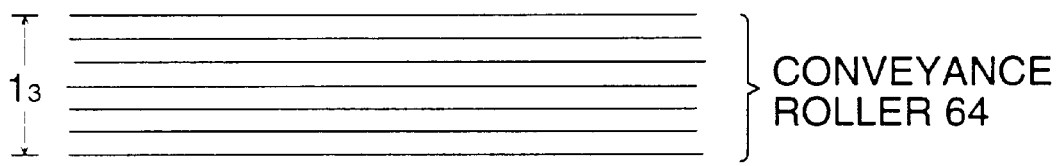
NUMBER OF $1_3$/ IMAGE LINES = ratio 64
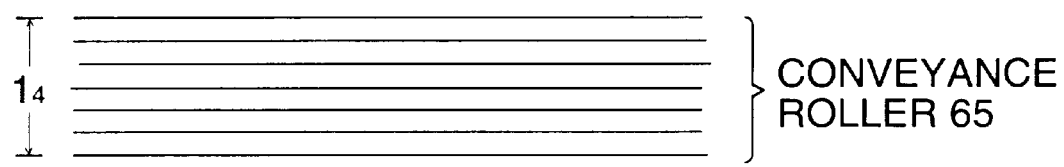
NUMBER OF $1_4$/ IMAGE LINES = ratio 65

PARALLELISM   DEVIATION OF PLURAL EXPOSURE HEADS IN MAIN SCANNING DIRECTION

ARRANGEMENT DEVIATION   DEVIATION OF PLURAL HEADS IN SUB-SCANNING DIRECTION

START POSITION ADJUSTMENT   SETTING FOR ACTUAL IMAGE OUTPUT

ZIGZAG ARRANGEMENT

IMAGE RECORDING APPARATUS ADJUSTMENT METHOD

BACKGROUND OF THE INVENTION

The present invention relates to an image recording apparatus wherein a silver halide photographic light-sensitive material is exposed to light by an exposure means for forming an image, and to an image recording apparatus adjustment method.

Some image recording apparatuses are represented by one wherein there is provided an exposure unit which is composed of plural exposure heads each being provided with plural emission sections arrayed in the form of a single dotted line or in the form of plural dotted lines and of an exposure head holding member which holds the exposure heads, and the plural exposure heads are used to expose a silver halide photographic light-sensitive material (hereinafter referred to simply as a light-sensitive material) to light to form an image and thereby to record a color image after processing the image.

When recording a color image by the use of a plurality of exposure heads each being provided with plural emission sections arrayed in a single dotted line or in plural dotted lines, quantity of emitted light for plural emission sections is sometimes fluctuated without being constant for reasons connected with manufacturing, which makes it necessary to adjust a quantity of emitted light of each emission section in advance.

In adjustment of a quantity of emitted light of each emission section stated above, when a focus point position of an exposure head is deviated, or exposure heads are not in parallel with each other, or when a direction of arrayed emission sections in one exposure head is different from that of the other exposure head, it is sometimes impossible to obtain sharp images, or it is impossible to perfectly adjust streak defect caused by exposure, even when a quantity of emitted light of each emission section is adjusted. When adjustments of parallelism and of array are made after a quantity of emitted light is corrected, a focus point position is deviated, which sometimes makes it necessary to readjust the adjusted quantity of emitted light.

SUMMARY OF THE INVENTION

An object of the invention is to provide a simple method of adjusting an image recording apparatus for obtaining an image with high image quality.

To solve the problems stated above and to attain the aforesaid object, the invention is structured as follows.

A method of adjusting an image recording apparatus having therein;
  a step to adjust at least one of the focus point position, parallelism and a position of an exposure means, and
  a step to correct a quantity of light of the exposure means after the aforesaid step for adjustment.

To solve the problems stated above and to attain the aforesaid object, the invention is structured as follows as a preferable embodiment.

(Item 1) An image recording apparatus provided with plural exposure heads each being provided with plural emission sections arrayed in the form of a single dotted line or in the form of plural dotted lines so that emission sections of plural exposure head expose a silver halide photographic light-sensitive material to light to form an image, wherein at least one adjustment among adjustment of focus point position of the exposure head, adjustment of parallelism between the exposure heads and adjustment of deviation of array direction for emission sections between the exposure heads is made, and then, a quantity of emitted light of an emission section of the exposure head is corrected.

In the invention described in Item 1 wherein positions of exposure heads are adjusted first not on a pixel unit basis, namely, without aligning positions precisely allowing deviation in size corresponding to 30% of a pixel size, for example, it is possible to obtain sharp images and to obtain images free from streak defect caused by exposure, by adjusting a quantity of emitted light of each emission section for preventing occurrence of unexposable area on a light-sensitive material caused by the deviation.

(Item 2) The image recording apparatus according to Item 1 wherein a focus point position is adjusted after conducting at least one of adjustment of parallelism between exposure heads and adjustment of deviation.

The invention described in Item 2 makes it possible to adjust a position of an exposure head at higher accuracy by adjusting a focus point position after conducting at least one of adjustment of parallelism between exposure heads and adjustment of deviation.

(Item 3) The image recording apparatus according to Item 1 or Item 2 wherein a focus point position is adjusted after conducting at least one of adjustment of parallelism between exposure heads and adjustment of deviation, and then, a quantity of emitted light is corrected.

In the invention described in Item 3, it is possible to adjust a position of an exposure head at higher accuracy, and then, by correcting a quantity of emitted light after that, it is possible to obtain sharp images and to obtain images free from streak defect caused by exposure.

(Item 4) The image recording apparatus according to either one of Item 1–Item 3 wherein a focus point position is adjusted after conducting at least one of adjustment of parallelism between exposure heads and adjustment of deviation, and then, a quantity of emitted light is corrected, and a quantity of light is adjusted in plural exposure heads.

In the invention described in Item 4, it is possible to adjust a position of an exposure head at higher accuracy, and by correcting a quantity of emitted light after that, and by adjusting a quantity of light in plural exposure heads and thereby by adjusting color balance in the course of exposure, it is possible to obtain sharp images and to obtain images free from streak defect caused by exposure.

(Item 5) The image recording apparatus according to either one of Item 1–Item 3 wherein a focus point position is adjusted after conducting at least one of adjustment of parallelism between exposure heads and adjustment of deviation, and then, a position to start emission is adjusted.

In the invention described in Item 5 wherein a position of the exposure head is adjusted highly accurately, and then, an amount of deviation for each exposure head is confirmed in terms of the number of lines regarding parallelism of exposure heads, then, that information is given to the apparatus, and for deviation in array direction, the position of a pixel for the start of exposure for each exposure head (how many pixels should be shifted to be outputted) is confirmed, then, that information is given to the apparatus, and thereby a position to start emission is adjusted, it is possible to conduct exposure free from deviation, if each exposure head is in parallel each other.

(Item 6) The image recording apparatus according to either one of Item 1–Item 3 wherein a focus point position is adjusted after conducting at least one of adjustment of parallelism between exposure heads and adjustment of deviation, and then, emission unit time is adjusted.

In the invention described in Item 6 wherein a position of the exposure head is adjusted highly accurately, and then, emission unit time is adjusted, it is possible to control occurrence of positional deviation even when conveyance speed of a certain conveyance means is different from that of another conveyance means when conveying plural exposure heads with plural conveyance means.

(Item 7) A method of manufacturing an image recording apparatus wherein plural exposure heads each being provided with plural emission sections arrayed in the form of a single dotted line or in the form of plural dotted lines are incorporated, then at least one of adjustment of a focus point position of the exposure head, adjustment of parallelism between exposure heads, and adjustment of deviation in the array direction for emission sections between exposure heads is conducted, and then, a quantity of emitted light of the emission section of the exposure head is corrected.

In the invention described in Item 7 wherein positions of exposure heads are adjusted first not on a pixel unit basis, namely, without aligning positions precisely allowing deviation in size corresponding to 30% of a pixel size, for example, it is possible to obtain sharp images and to obtain images free from streak defect caused by exposure, by adjusting a quantity of emitted light of each emission section for preventing occurrence of unexposable area on a light-sensitive material caused by the deviation.

(Item 8) The method of manufacturing an image recording apparatus according to Item 7 wherein a focus point position is adjusted after conducting at least one of adjustment of parallelism between exposure heads and adjustment of deviation.

The invention described in Item 8 makes it possible to adjust a position of an exposure head at higher accuracy by adjusting a focus point position after conducting at least one of adjustment of parallelism between exposure heads and adjustment of deviation.

(Item 9) The method of manufacturing an image recording apparatus according to Item 7 or Item 8 wherein a focus point position is adjusted after conducting at least one of adjustment of parallelism between exposure heads and adjustment of deviation, and then, a quantity of emitted light is corrected.

In the invention described in Item 9, it is possible to adjust a position of an exposure head at higher accuracy, and then, by correcting a quantity of emitted light after that, it is possible to obtain sharp images and to obtain images free from streak defect caused by exposure.

(Item 10) The method of manufacturing an image recording apparatus according to either one of Item 7–Item 9 wherein a focus point position is adjusted after conducting at least one of adjustment of parallelism between exposure heads and adjustment of deviation, and then, a quantity of emitted light is corrected, and a quantity of light is adjusted in plural exposure heads.

In the invention described in Item 10, it is possible to adjust a position of an exposure head at higher accuracy, and by correcting a quantity of emitted light after that, and by adjusting a quantity of light in plural exposure heads and thereby by adjusting color balance in the course of exposure, it is possible to obtain sharp images and to obtain images free from streak defect caused by exposure.

(Item 11) The method of manufacturing an image recording apparatus according to either one of Item 7–Item 9 wherein a focus point position is adjusted after conducting at least one of adjustment of parallelism between exposure heads and adjustment of deviation, and then, a position to start emission is adjusted.

In the invention described in Item 11 wherein a position of the exposure head is adjusted highly accurately, and then, an amount of deviation for each exposure head is confirmed in terms of the number of lines regarding parallelism of exposure heads, then, that information is given to the apparatus, and for deviation in array direction, the position of a pixel for the start of exposure for each exposure head (how many pixels should be shifted to be outputted) is confirmed, then, that information is given to the apparatus, and thereby a position to start emission is adjusted, it is possible to conduct exposure free from deviation, if each exposure head is in parallel each other.

(Item 12) The method of manufacturing an image recording apparatus according to either one of Item 7–Item 9 wherein a focus point position is adjusted after conducting at least one of adjustment of parallelism between exposure heads and adjustment of deviation, and then, emission unit time is adjusted.

In the invention described in Item 12 wherein a position of the exposure head is adjusted highly accurately, and then, emission unit time is adjusted, it is possible to control occurrence of positional deviation even when conveyance speed of a certain conveyance means is different from that of another conveyance means when conveying plural exposure heads with plural conveyance means.

(Item 13) The method of manufacturing an image recording apparatus according to either one of Item 7–Item 12 wherein an exposure of a test pattern is given to a silver halide photographic light-sensitive material by the exposure head, and then, a quantity of emitted light of the emission section of the exposure head is corrected based on the image obtained through processing of the aforesaid silver halide photographic light-sensitive material.

In the invention described in Item 13 wherein an exposure of a test pattern is given to a silver halide photographic light-sensitive material by the exposure head, and then, a quantity of emitted light of the emission section of the exposure head is corrected based on the image obtained through processing of the aforesaid silver halide photographic light-sensitive material, it is possible to conduct correction of a quantity of emitted light matching the silver halide photographic light-sensitive material and thereby to obtain sharp images and images free from streak defect caused by exposure.

The present invention can be applied when manufacturing an image recording apparatus, and even when conducting maintenance on the image recording apparatus after its manufacture.

Adjustment of parallelism of an exposure means is to adjust the exposure means so that it may keep its original parallelism. For example, the adjustment includes positioning of exposure means in the course of manufacturing of an apparatus so that the exposure means may be in parallel each other, correcting poor parallelism of the exposure means in the course of maintenance to parallelism of the exposure means which needs to be kept originally, and keeping the state when the exposure means are in the state of keeping the parallelism which needs to be kept originally.

Further, when an exposure means has therein only one exposure head, the adjustment means adjusting of relative parallelism between an exposure head itself and a recording medium, while when the exposure means has plural exposure heads, the adjustment means at least one of adjustment of the above-mentioned parallelism and adjustment of parallelism between exposure heads.

Adjustment of a position of an exposure means is to adjust the exposure means so that it may be at the position which needs to be kept originally. For example, the adjustment includes positioning of exposure means in the course of manufacturing of an apparatus so that the exposure means may be at the position to which the exposure means needs to be attached originally, correcting the poor position of the exposure means in the course of maintenance to the position to which the exposure means needs to be attached originally, and keeping the state when the exposure means is in the state of being kept at the position to which the exposure means needs to be attached originally, in the case of maintenance.

BRIEF DESCRIPTION OF THE DRAWINGS

FIG. 6 is a diagram showing that a time interval of enable signals for each color is established for each bit.

FIG. 22 is a diagram showing an output standard image for exposure timing adjustment.

FIG. 26 is a diagram illustrating adjustment of emission unit time.

FIG. 26 is a diagram illustrating adjustment of emission unit time.

DETAILED DESCRIPTION OF THE PREFERRED EMBODIMENT

As an embodiment, there will be shown as follows a concrete example of an image recording apparatus and that of a method of manufacturing an image recording apparatus of the invention, to which the invention is not limited. Though there are decisive expressions for terminology in the embodiment, they only indicate preferable examples of the invention, and they do not limit the meaning of terminology and a technical scope of the invention.

With regard to an exposure means, there will be explained an occasion employing plural exposure heads, to which, however, the invention is not limited. The invention can also be applied to an occasion where an exposure means has only one exposure head. With regard to an exposure head, there will be explained an array head, to which, however, the invention is not limited. The invention can also be applied to an occasion where a laser is used. However, it is preferable, in particular, that the present invention is applied when an LED which requires strict adjustment of focus point and a vacuum fluorescent tube are used. It is also preferable to use an array head from the viewpoint of strict adjustment of parallelism. It is further preferable that an exposure means has plural exposure heads from the viewpoint of strict adjustment of positional deviation.

In the present specification, when plural exposure heads are used, an aggregate thereof is made to be an exposure means, while when only one exposure head is used, an exposure head itself is made to be an exposure means for explanation.

Figure 1:
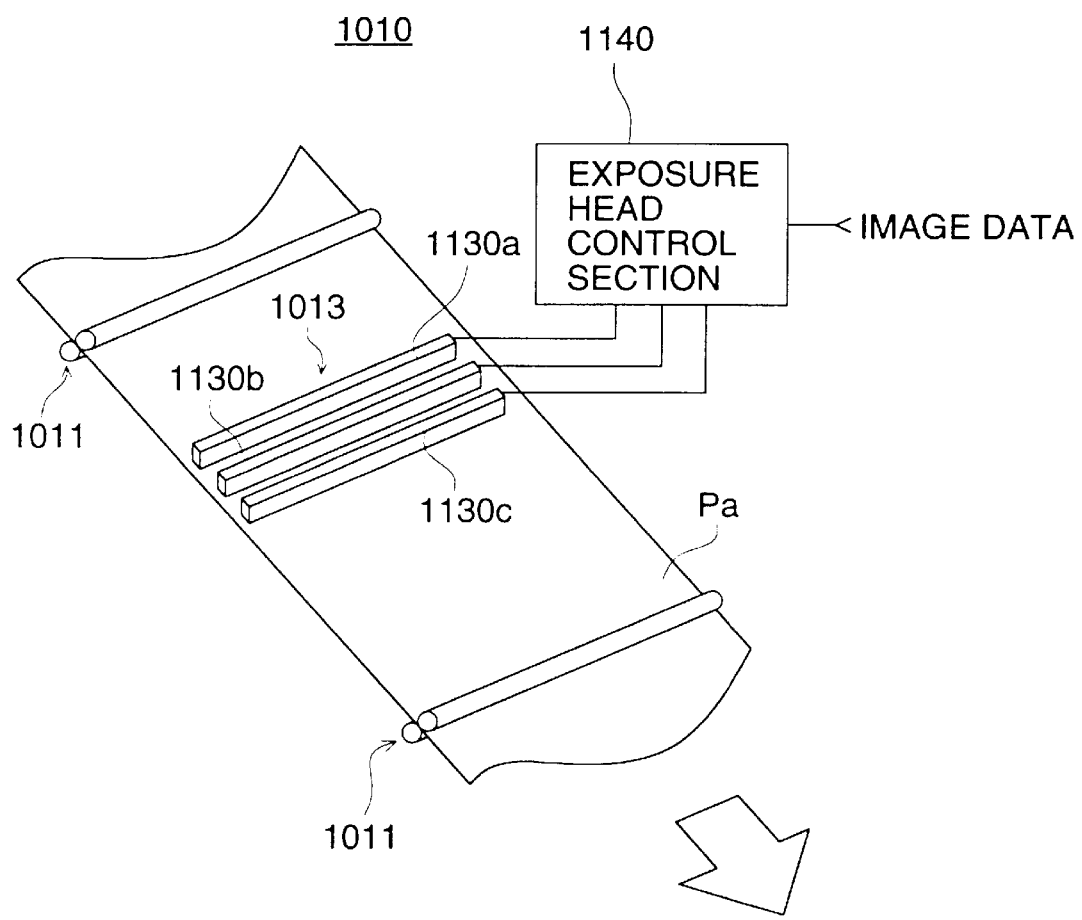
FIG. 1 is a perspective view showing the schematic structure of an image recording apparatus.

Details of exposure head group (recording head group, array head) in image recording apparatus 1010 will be explained. FIG. 1 is a perspective view showing the schematic structure of image recording apparatus 1010 in which photographic paper Pa is conveyed in the arrowed direction by conveyance roller 1011 which constitutes a conveyance means. The conveyance means may also be constituted by a rotary drum.

Red light source exposure head 1130a having an LED array, green light source exposure head 1130b having a vacuum fluorescent tube array, and blue light source exposure head 1130c, all constituting exposure head group 1013 are exposure-controlled by exposure head control section 1140 in accordance with image data, and thereby, a prescribed position on photographic paper Pa is exposed to light for each color. Incidentally, on each exposure head, there are used recording elements constituting plural emission sections arranged in the shape of a single array or plural arrays, and red light source exposure head 1130a employs one wherein a SELFOC lens array is combined as an image forming optical system with an LED array having recording element density of 300 dpi, while, green light source exposure head 1130b and blue light source exposure head 1130c employ one wherein a filter for color separation is combined with a vacuum fluorescent tube exposure head in which a SELFOC lens array is combined as an image forming optical system with a vacuum fluorescent tube array with 300 dpi. Incidentally, a combination of a vacuum fluorescent tube array and a SELFOC lens is generally called VFPH (Vacuum Fluorescent Print Head). Though photographic paper Pa is in a roll shape in the explanation in this case, it may also be a cut sheet. In addition, an image forming optical system of a recording element may also be a roof mirror lens array, without being limited to a SELFOC lens array.

In the present embodiment, an LED array and a vacuum fluorescent tube array are combined properly for interpolating color emission characteristics of a recording head so that exposure of each color may be conducted efficiently, and exposure to a color silver halide light-sensitive material may be conducted at high speed accordingly. Further, since a recording element having recording element density of 300 dpi is used as a recording array, high image quality and a small-sized apparatus can be realized. In particular, when an LED array is used for exposure to red color, and a vacuum fluorescent tube array is used in combination with an appropriate filter for exposure to green light and exposure to blue light, emission characteristics of the LED array are interpolated even for photographic paper Pa having low sensitivity for red color. Therefore, it is possible to conduct exposure and recording at high speed and to make an apparatus to be inexpensive. In addition, even for exposure to green color and blue color, a vacuum fluorescent tube array which can assure the resolution is used without using an LED array which is not immune to low resolution. Therefore, it is possible to realize a small-sized apparatus having high resolution.

Next, recording operations of image recording apparatus 1010 will be explained with reference to FIG. 2.

Red light source exposure head 1130a having LED array 1133a, green light source exposure head 1130b having vacuum fluorescent tube array 1133b and blue light source exposure head 1130c having vacuum fluorescent tube array 1133c are provided to be in parallel with the direction to convey photographic paper Pa. When these exposure heads are subjected to exposure control in accordance with image data by exposure head control section 1140, irradiation light forms an image on photographic paper Pa through SELFOC lens arrays 1131a, 1131b and 1131c, and component of each color is recorded. Incidentally, yellow filter 1132b and blue filter 1132c which are for color separation are inserted respectively in the green light source exposure head 1130b and blue light source exposure head 1130c. An ND filter or the like which is for adjustment of a quantity of light may also be added to each exposure head.

The reason why the yellow filter 1032b is used for color separation for green color is that transmissivity of a yellow filter is higher than that of a green filter, for green light. As filters for color separation for blue color, green color and red color, there are generally used a blue filter which mainly transmits light in a wavelength zone shorter than about 500 nm, a green filter which mainly transmits light in a wavelength zone between about 500 nm and 600 nm, and a red filter which mainly transmits light in a wavelength zone longer than about 600 nm, in a visible light zone between about 400 nm and 700 nm.

Incidentally, the yellow filter mentioned above is one which is called a yellow filter or a Y filter and is available on the market, and LEE Filter HT015 (Y Filter) made by LEE Filters Co. in England, for example, can be used preferably, because it has transmissivity of 60% or more at the wavelength of 550 nm. Namely, a filter which has transmissivity of 50% or more at the wavelength of 550–700 nm and has transmissivity of 5% or less at the wavelength of 400–480 nm is preferable. Even for the blue filter, LEE Filter 181 (B Filter) made by LEE Filters Co. in England, can be used preferably in the same way, because it has transmissivity of 30% or more at the wavelength of 430 nm. Since it is possible to use a filter available on the market as stated above, an apparatus can be made inexpensive. A green filter sandwiched between a red wavelength zone and a blue wavelength zone takes a type of a band-pass filter, its peak transmissivity is small because light leakage for blue and red is controlled, and green light of vacuum fluorescent tube array 1133b can not be taken out efficiently. Contrary to this, the yellow filter can take out green light of the vacuum fluorescent tube array 1133b efficiently, because it transmits light in a wavelength zone longer about 500 nm.

However, the yellow filter transmits also red light. But there is no color forming by red color, because sensitivity of photographic paper Pa to red color is extremely low. Therefore, employment of vacuum fluorescent tube array 1133b for recording on photographic paper Pa makes it possible to use yellow filter 1132b. As a result, it has become possible to enhance exposure efficiency for green color, and exposure at high speed and at high image quality has become possible.

(Recording operations)

Operations to conduct color recording for one line on photographic paper Pa will be explained with reference to FIGS. 1 and 2.

First, exposure head control section 1140 transmits red color image data, green color image data and blue color image data each being for one line to the exposure head. Conveyance roller 1011 conveys photographic paper Pa at constant speed, and when point a on photographic paper Pa shown in FIG. 2 arrives at an image forming point of red light source exposure head 1130a, the exposure head control section 1140 controls the red light source exposure head 1130a to conduct exposure in accordance with image data so that red image data may be recorded on photographic paper Pa.

Then, as photographic papers Pa are conveyed in succession, exposure control identical to the foregoing is conducted in synchronization with timing of point a to arrive at each of image forming point (2) of green light source exposure head 1130b and image forming point (3) of blue light source exposure head 1130c, and color recording is conducted on the point a. By repeating these operations, it is possible to conduct recording of color images on a two-dimensional basis on a prescribed area of photographic paper Pa.

The timing mentioned above is one to be determined in advance by an interval of each exposure head and by conveyance speed for photographic paper Pa, and this timing is stored in an apparatus in advance. When a change is made on an interval of the exposure head or on the conveyance speed, the timing mentioned above is also changed.

Figure 2:
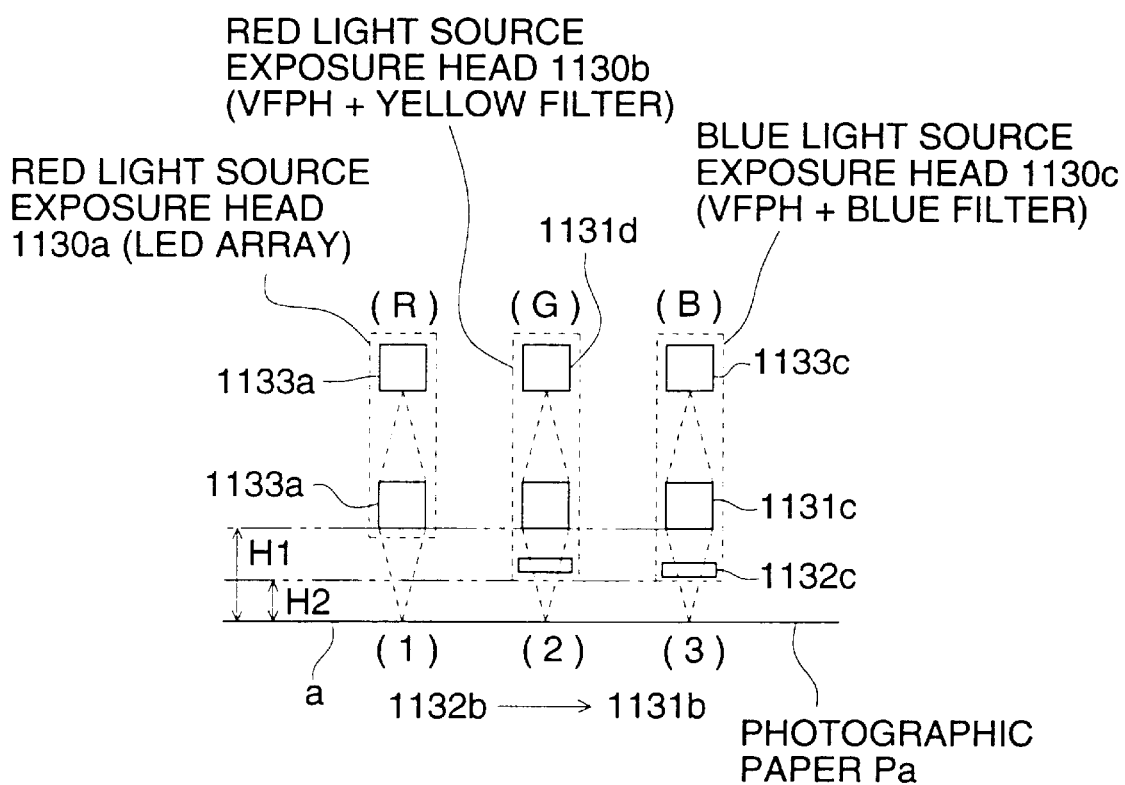
FIG. 2 is a diagram illustrating recording operations of an image recording apparatus.

In each exposure head, distance H1 from the surface of a SELFOC lens of the exposure head shown in FIG. 2 facing photographic paper Pa to the surface of the photographic paper Pa is not less than 2 mm, and distance H2 from the surface of the exposure head shown in FIG. 2 nearest to photographic paper Pa to the surface of the photographic paper Pa is not more than 10 mm, which makes it easy to cause photographic paper Pa to pass stably and makes it easy to conduct exposure with sufficient illuminance.

(Exposure head control section)

Now, the exposure head control section 1140 will be explained in detail.

Figure 3:
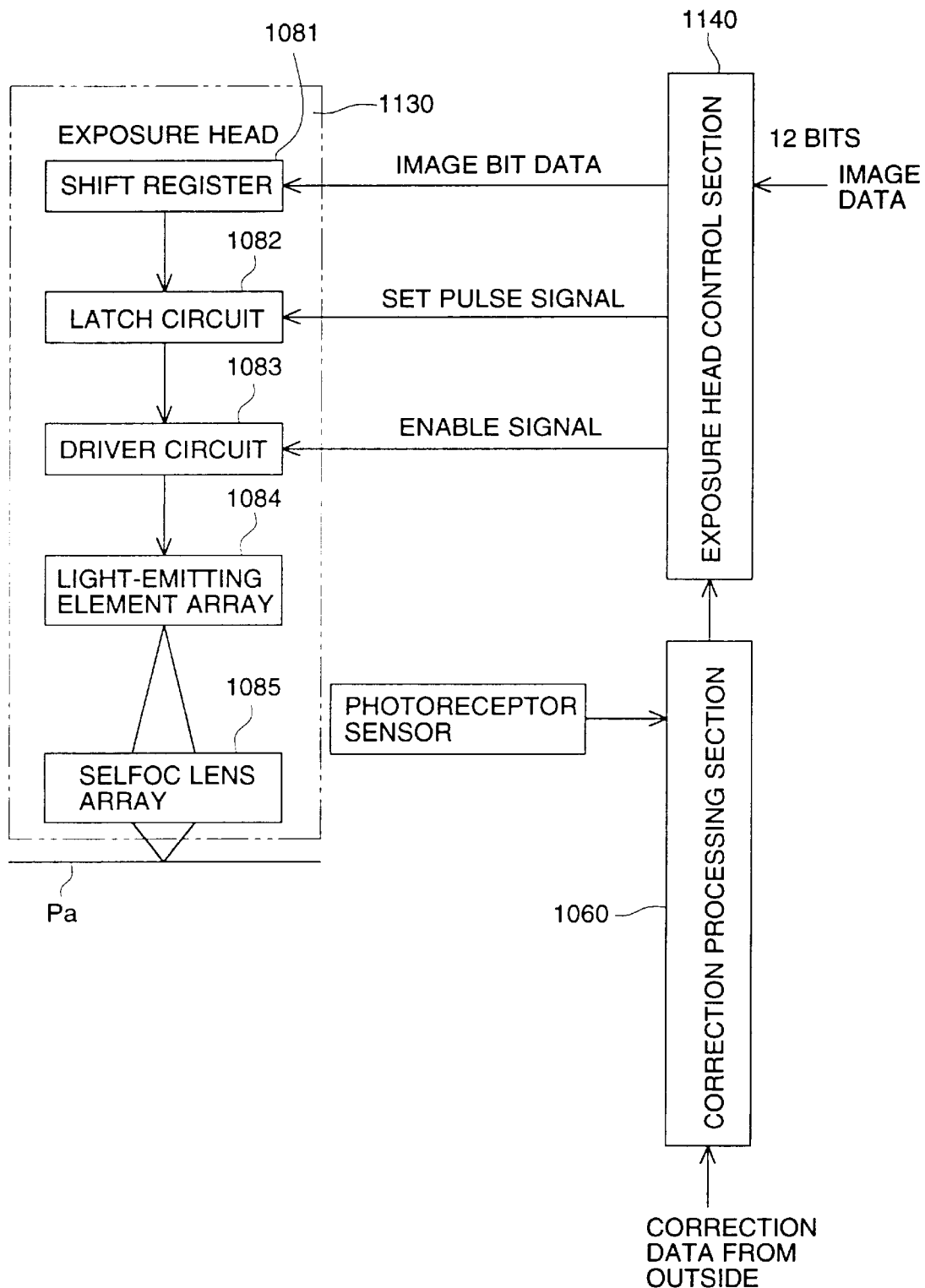
FIG. 3 is a block diagram of drive control circuit illustrating image data writing operations of an exposure head for one color.

FIG. 3 is a block diagram of drive control circuit illustrating image data writing operations of an exposure head for one color. In this diagram, when image data wherein gradation is expressed with 12-bit digital values are inputted for each color, the exposure head control section 1140 conducts correction processing for image data based on correction data from correction processing section 1060 for correcting deviation in emission characteristics of each recording element constituting an emission section, then, converts into serial digital image data of one line pixel for each recording element, and generates set pulse signal for transmitting image bit data to latch circuit 1082 and enable signal for controlling emission time, to output to exposure head 1130 for one color. In this case, image bit data represent specific bit data among image data.

In the exposure head 1130, when data of MSB (most significant bit) are transferred from exposure head control section 1140 to shift register 1081 as image bit data for one line, set pulse signals are inputted in latch circuit 1082, and data of MSB for one line are latched in latch circuit 1082 in synchronization with the set pulse signals. Then, when enable signals having the width corresponding to the gradation are inputted into a driver circuit, each recording element in recording elements arranged in a shape of an array of a single or plural rows within an interval of a time width of the enable signals is drive-controlled, and emission in accordance with latched image data is performed.

Namely, driver circuit 1083 sends out drive signals selectively to recording element array 1084, making it to correspond to the pixel where latched data represent "1", so that emission may be performed only for the time width of the enable signals. Irradiation light forms an image on photographic paper Pa through SELFOC lens array 1085 to form a latent image thereon. When this processing is conducted for each of all bits from MSB to LSB (least significant bit) in succession, recording for one line is completed. The sequence of the bits may be either one starting from LSB or another sequence, and it is not limited. Though the control for one color is explained above, the same control is applied to three colors.

Incidentally, a method to generate enable signals in accordance with a bit position will be explained in detail later.

(Operations of an exposure head control section)

Figure 4:
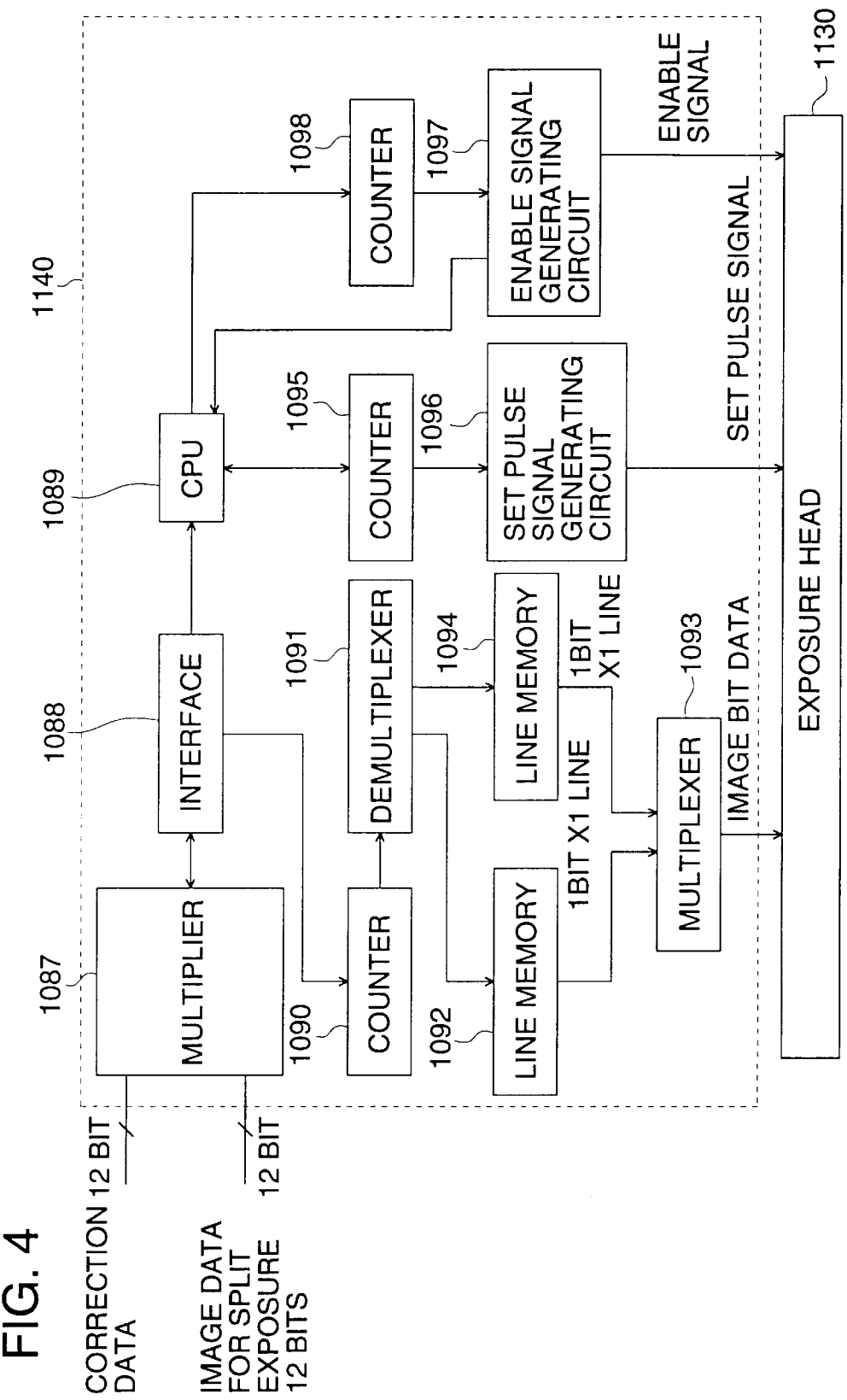
FIG. 4 is a detailed block circuit diagram of an exposure head control section.

FIG. 4 is a detailed block circuit diagram of exposure head control section 1140, and operations of the exposure head control section 1140 will be explained as follows, referring to FIG. 4.

First of all, multiplier 1087 corrects image data by multiplying correction data of emission characteristics obtained at the correction processing section 1060 stated above and image data, and outputs them to interface 1088. CPU 1089 drives counter 1090 by setting a count initial value which counts pixels for one line in counter 1090 through interface 1088, and controls dimultiplexer 1091 for input switching. Receiving this, the counter 1090 starts counting and outputs the counted value to the dimultiplexer 1091. Then, based on the counted value, each pixel of image data is processed to be developed to density value constituted with 12 bits to be written in line memory 1092 as image data for 12-bit X1 line.

When writing of image data for the first line into line memory 1092 is completed, image bit data for the first line are outputted from the line memory 1092 to multiplexer 1093, covering from MSB to LSB in succession, and then, are transferred to exposure head 1130. On the other hand, image data for the second line are written in line memory 1094 after the output path for them is switched by demultiplexer 1091. Because of the repetition of processing wherein, in the course of transferring image data for the current line to exposure head 1130, image data for the following line are processed to be developed and are written in another memory as state above, image data for each line can be outputted continuously without being tied up.

When counter 1095 counts, based on control of CPU 1089, the time to transfer image bit data to multiplexer 1093 to output count up signals to set pulse signal generating circuit 1096, the set pulse signal generating circuit 1096 generates set pulse signals in the timing of completion of transfer of image data to exposure head 1130, to output them to the exposure head 1130 and to output them also to enable signal generating circuit 1097.

On the other hand, when counter 1098 counts, under control of CPU 1089, the enable time corresponding to a density value assigned to each bit of 12 bits in advance, to output them to enable signal generating circuit 1097, the enable signal generating circuit 1097 responds to the generation of the set pulse signals and generates from MSB (most significant bit) in 12 bits the enable signals having enable time corresponding to that bit to output them to exposure head 1130 and to output them also to CPU 1089. Responding to this, the CPU 1089 controls counter 1095 to generate the following set pulse signals.

When a series of these operations are repeated, set pulse signals, enable signals and image bit data covering from MSB to LSB for each line are outputted successively to exposure head 1130 at their own timing.

Figure 5:
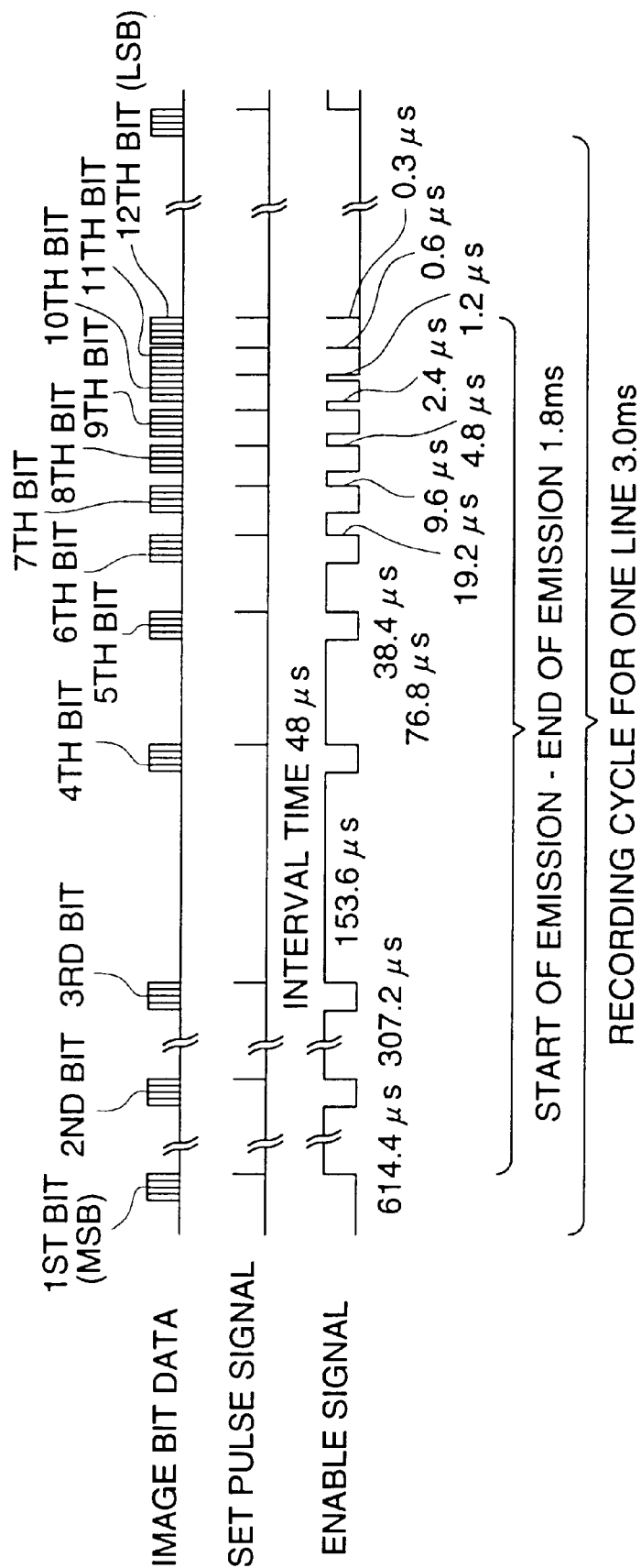
FIG. 5 is a timing chart of output signals outputted to an exposure head from an exposure head control section.

FIG. 5 is a timing chart of output signals outputted to exposure head 1130B from exposure head control section 1140. For each pixel, MSB for one line out of image data constituted with 12 bits is first outputted and transferred to exposure head 1130*b*, and then, set pulse signals and enable signals are outputted. In this case, an occasion wherein latch data, namely, a bit value for all enable signals from MSB to LSB for one recording element is "1" and emission is conducted represents the longest exposure time which gives the maximum density. Interval time between enable signals is set to 48 μsec. The same control is conducted to other exposure heads 1130*a* and 1130*c*.

A time width of an enable signal for each color in this case is recognized as shown in FIG. 6 for each bit.

(Adjustment of quantity of emitted light)

Adjustment of quantity of emitted light will be explained as follows.

When a light source wherein a number of recording elements are arranged in a form of an array is used, a quantity of emitted light for each pixel is not the same, and when recording on a recording medium for reproducing continuous tone such as a silver halide light-sensitive material, there is caused density unevenness corresponding to uneven quantity of emitted light which deteriorates image quality greatly. It is therefore necessary to control a quantity of emitted light for each pixel and to control fluctuation of the quantity of emitted light. Let it be assumed that the correction of image data for controlling such fluctuation of the quantity of emitted light is called the correction between pixels.

In this case, it is also possible to correct image data by calculating correction data for dispersion of a characteristic for each recording element of an exposure head based on the following correction system, in place of calculation of correction data based on measurement of a quantity of light conducted after successive light-intercepting of exposure head 1130 shown in the embodiment stated above.

(Correction system)

Figure 19:
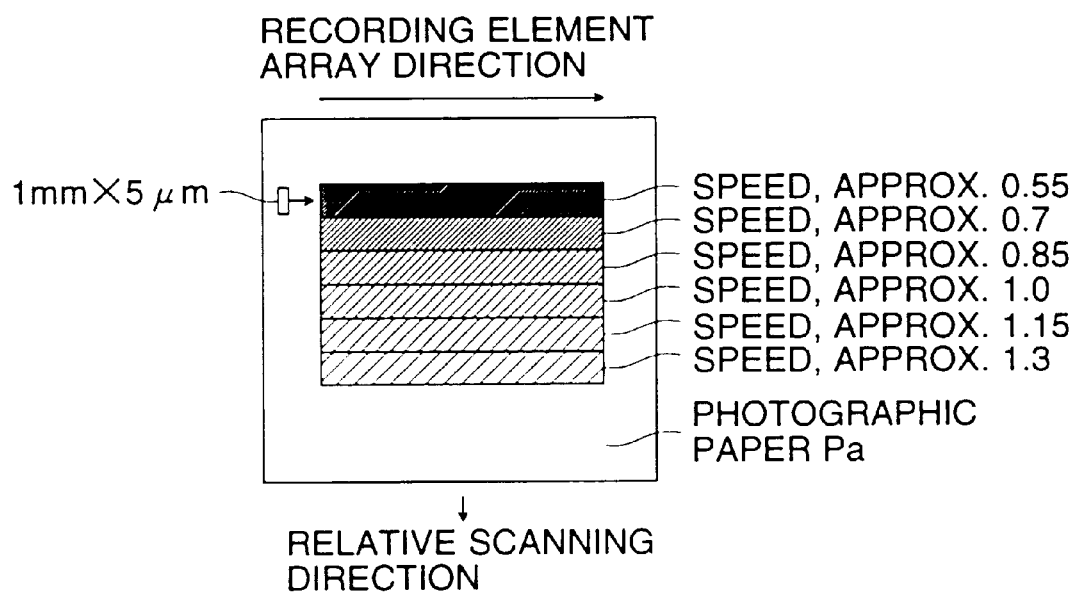
FIG. 19 is a diagram showing the direction of array of recording elements and density of a photographic paper.

1) All recording elements are caused to emit light at the same image data value in the direction of arrangement of recording elements at various density steps which make density values on photographic paper Pa to be 0.55–1.3 as shown in FIG. 19, and the photographic paper Pa is subjected to exposure and processing to obtain strip-shaped print images for correction.

2) The print image for correction obtained through the operations explained above is subjected to density measurement in the direction of arrangement of recording elements of exposure head 1130 by the use of a density measuring instrument (Konica Microdensitometer PDM—5TYPEBR made by Konica Corp.) to obtain density data.

In the case of density measurement, a filter is mounted for each color to be measured. The filter matching each light-sensitive layer is mounted, like a red filter is mounted when measuring density for red-sensitive layer, a green filter is mounted when measuring density for green-sensitive layer and a blue filter is mounted when measuring density for blue-sensitive layer.

Next, for obtaining density data for each recording element accurately, an adjustment is made to make the scanning direction in the density measuring instrument and the direction of arrangement of recording elements to be in parallel with each other to prevent measurement in the diagonal direction.

Then, the density measuring instrument is focused on a light-sensitive material to be measured, and measurement conditions are further adjusted. An aperture of 1 mm×5 μm shown in FIG. 19 was used this time.

Further, for adjustment of density resolution in the course of measurement, output voltage of the density measuring instrument was adjusted with an unexposed portion (white background) serving as a standard.

Figure 7:
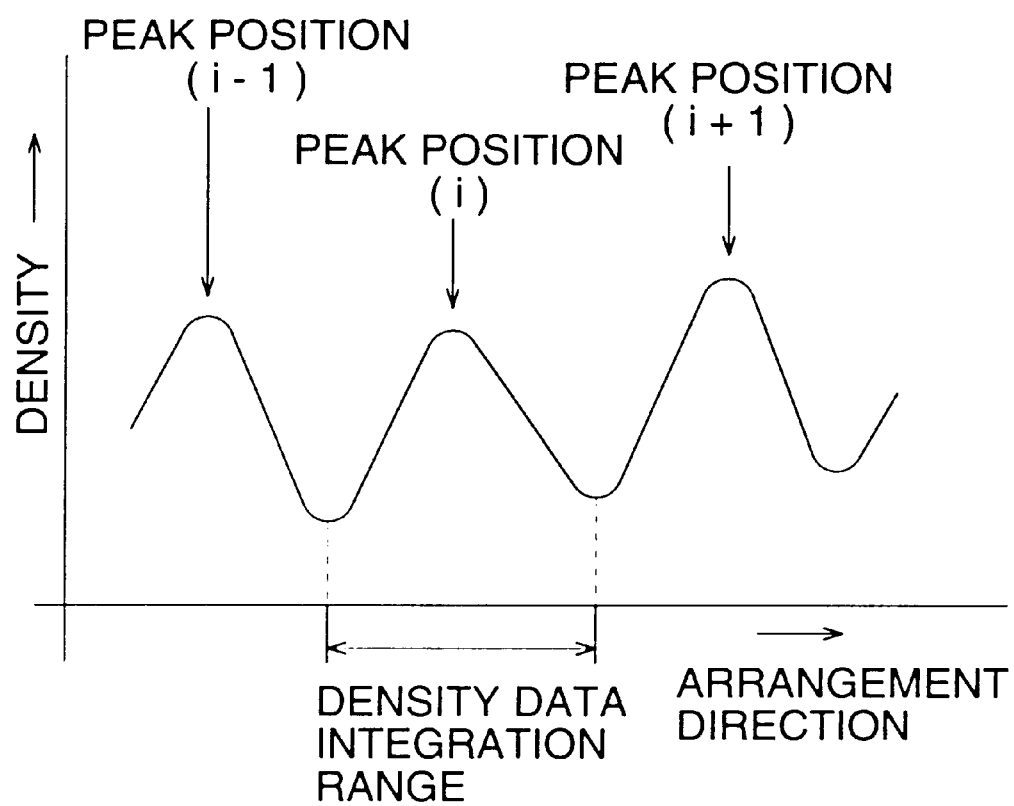
FIG. 7 is a diagram showing an example of the obtained density data.

3) FIG. 7 shows an example of density data obtained in the aforesaid manner, and this data has a form wherein density data shows its peak for position of each recording element, and based on this, density peak position (i) is detected for all recording elements (n pieces). Several data (8 data before and after the peak position (i) in total are used in this case) positioned before and after the obtained peak position (i) are integrated together with peak density data, and thereby, integration density (Di) for each peak position is calculated.

Integration densities D(0.55)i–D(1.3)i are calculated for each pixel in the same way as in the foregoing for each density step.

Integration densities D(0.55)i–D(1.3)i for each pixel thus obtained and common logarithm values of image data values are used to conduct linear analogue through calculation of the least square method, and regression linear expression for each pixel is calculated. From this expression thus obtained, a common logarithm image data value (LSi) of each pixel at integration density 1.0 is calculated, and further, an average value of common logarithm image data values (LSi) of pixels which are obtained in the same way as in the foregoing is obtained, and this average value is made to be standard data value ($LS_0$).

From the result of the foregoing, correction data (Ci) is calculated as follows.

$$ci = 10^{(Lsi-LS0)}$$

Figure 20A:
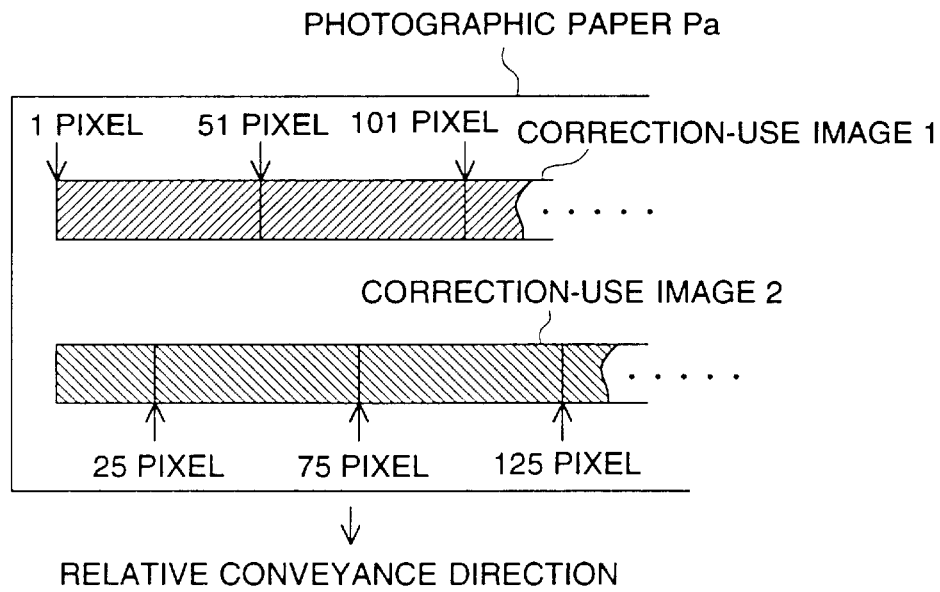
FIGS. 20(a) and 20(b) are diagrams showing the direction of array of recording elements and an image for correction of a photographic paper.
Figure 20B:
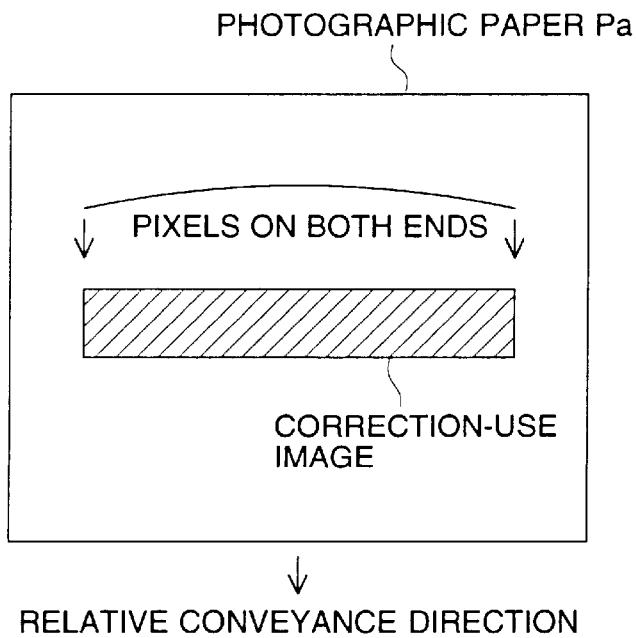

Though an arrangement position of a recording element of the exposure head is determined by detecting the peak of density data as stated above in the aforesaid correction system, a clear peak sometimes does not appear on density data, depending on conveyance accuracy or on accuracy for mounting an exposure head. In that case, it is possible to calculate integration density by estimating a position of a recording element through the following method, for example, as shown in FIG. 20. As a method to estimate the peak position in this case, there is given a method wherein high density portions are prepared several recording elements apart, and their peaks are detected by comparing them with the standard density, and a distance between the peaks is divided by the number of the recording elements at regular intervals to find peak positions.

To be concrete, the following procedures can be employed for execution.

1) Exposure is conducted in the same way as in the foregoing except that a greater exposure amount is given to each recording element at an interval of 50 recording elements from the first recording element, and image for correction 1 is obtained.

2) A peak position of a high density portion on density data is detected by comparing with the standard density.

3) A distance between high density peaks is divided at regular intervals by 50 that is the number of recording elements existing on the distance to obtain a peak position of each recording element and to obtain integration density in the same way as in the foregoing.

4) Since an influence of the high density pixel makes it impossible to obtain accurate integration density for the recording element exposed to light in high exposure amount and for several recording elements surrounding the aforesaid recording element, the same operations as in the foregoing are given to each recording element at an interval of 50 recording elements from the 25th recording element (FIG. 20 (A)).

5) From integration densities obtained respectively from images for correction 1 and 2, a portion which is not affected by high density images is extracted to be integration density of each recording element, and correction data (Ci) are obtained in the same way as in the foregoing.

Further, by making only pixels on both ends of a recording element of the exposure head to be high in terms of density as shown in FIG. 20 (B) without preparing high density portions at intervals of several recording elements as in the foregoing, and by dividing the distance between the aforesaid both ends at regular intervals with the number of the recording elements to make them to be peak positions, it is possible to obtain a correction value with one image for correction without using two kinds of images for correction even when a clear peak does not appear, which is preferable because it is simple and less time consuming. Even when correction values of the recording elements at both ends are not accurate, an image obtained is excellent because the inaccurate correction values are not conspicuous on the image as blotches.

The same effect as in the foregoing can also be obtained for several pixels located in the vicinity of both ends, because they can be regarded as both ends substantially though they are not the both ends in the strict sense of the word.

It was also possible to obtain the same effect as in the foregoing by detecting bottom positions by making the exposure amount of the specific recording element to be smaller than that for other recording elements, in place of detecting peak positions by making the exposure amount of the specific recording element to be greater than that for other recording elements in the above item 1). When the aforesaid correction method is used in combination with a method wherein a peak position for each recording element is detected for those where a peak position of each recording element can be recognized partially, it is possible to conduct accurate correction efficiently, which is preferable.

It is also possible to improve peak separation by outputting plural images for correction by shifting emission elements in the method to make emission elements to emit simultaneously at an interval of one recording element, then, at an interval of two recording elements and at an interval of four recording elements.

It is preferable to make the distance to the nearest recording element capable of being driven simultaneously in forming an image actually to be the same as the distance to the nearest recording element capable of being driven simultaneously in forming an image for calculating a correction amount, from the viewpoint of obtaining a correction amount under the condition that is close to the actual image forming condition.

Density of an image to be used for measurement of density for obtaining a correction amount has only to be one which makes it possible to measure dispersion of light and shade, and it preferably is density on the linear portion of a characteristic curve of the light-sensitive material used. In the case of a color paper in the aforesaid example, when the density is made to be 0.5–1.5 approximately, gradation is hard and a density difference for fluctuation of an amount of light is great to improve correction accuracy, which is preferable.

Obtaining correction data by measuring further the images for correction outputted by the use of correction data obtained in the aforesaid method is preferably used from the viewpoint that an image having less unevenness in an amount of light can be outputted.

Deconvolution after calculation of integration density of each pixel, or deconvolution after calculation of correction data of each pixel is preferably used because it makes it possible to obtain the result which is further better.

In the aforesaid Examples A and B and correction system 1, a photographic paper (paper for a silver halide photographic light-sensitive material) is used for images for correction and images for evaluation. However, the silver halide light-sensitive material is not limited to this, and it was also possible to obtain the same effect even when a light-sensitive material and a recording head shown in other examples in the present specification were used. The same effect was further obtained by using a light-sensitive material capable of forming a visible image shown below and by adjusting by the use of a light source matching that light-sensitive material.

As a concrete example, when using a transparent or translucent photographic paper, a negative film, a reversal film, a reversal paper and a light-sensitive material having therein a self-processing solution (instant light-sensitive material), the same effect as in the foregoing was obtained by adjusting an amount of light and a balance of an amount of light (ratio of an amount of light for R, G and B) in accordance with sensitivity of each light-sensitive material and by conducting the same correction.

(Synchronization control of exposure head)

Figure 8:
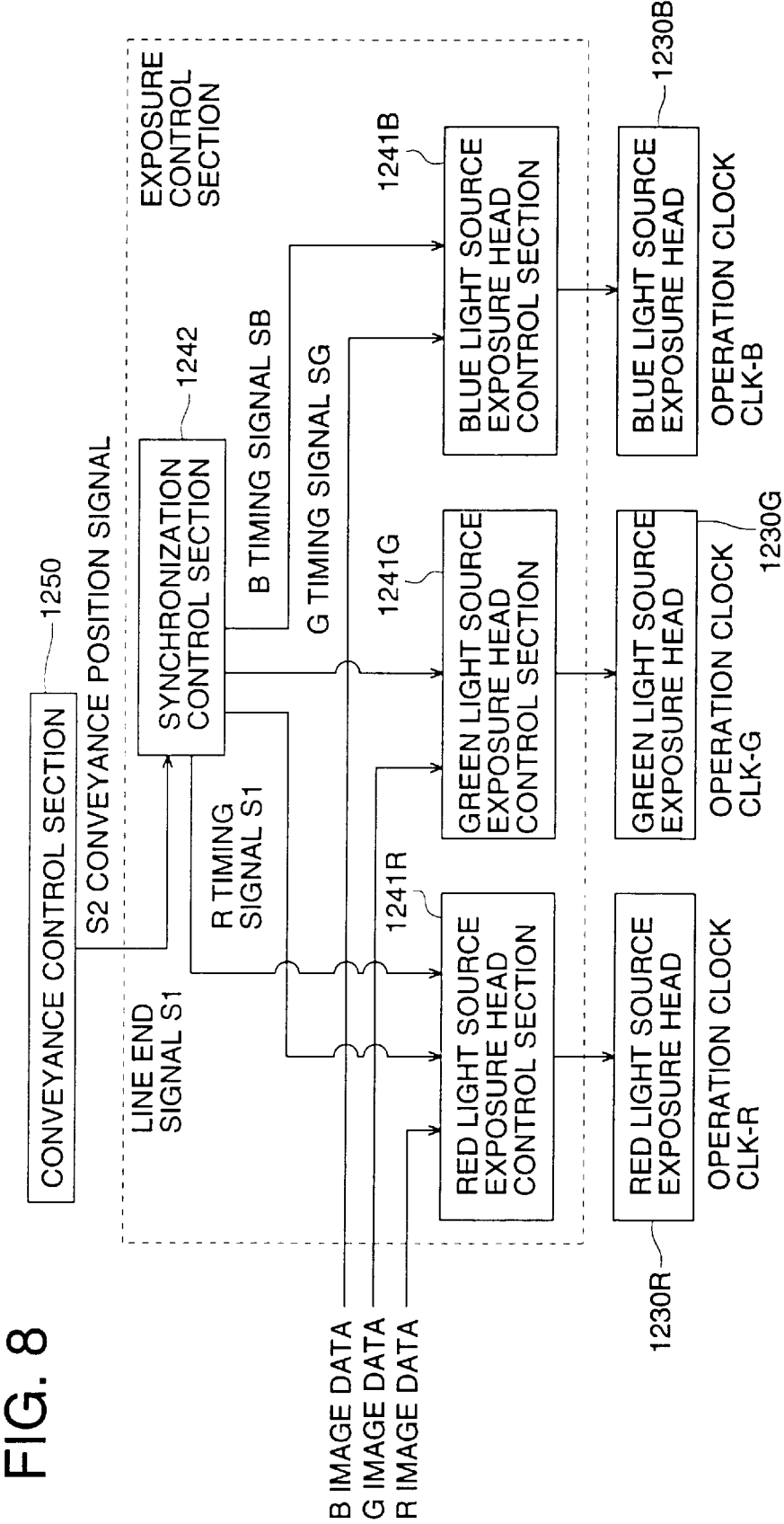
FIG. 8 is a block diagram illustrating synchronization control of each exposure head.

Next, synchronization control of each exposure head (recording element array) will be explained with reference to FIG. 8.

Red light source exposure head 1230R is driven by operation clock CLK-R, green light source exposure head 1230G is driven by operation clock CLK-C and blue light source exposure head 1230B is driven by operation clock CLK-B.

Red light source exposure head control section 1241R230R, green light source exposure head control section 1241G and blue light source exposure head control section 1241B generate respectively operation clock CLK-R, operation clock CLK-G and operation clock CLK-B, and each of them controls each exposure head based on each clock as stated above, and conducts recording of gradation image in accordance with each corresponding image data.

The aforesaid operation of each of the exposure head control sections 1241R, 1241G and 1241B is timed with each of R timing signal S-R, C timing signal S-G and B timing signal S-B all coming from synchronization control section 1242 for each recording of one line of the image, and thereby is subjected to synchronization control.

Figure 9:
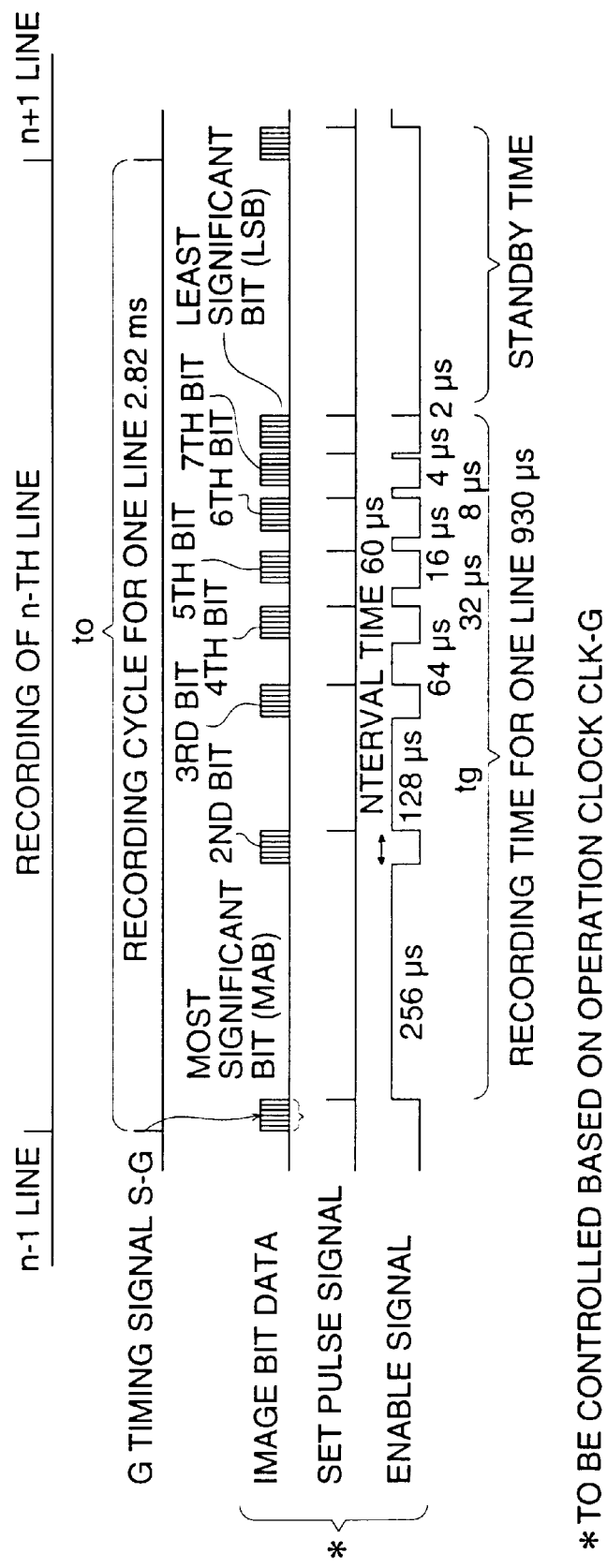
FIG. 9 is a timing chart showing operations of a green light source exposure head control section.

FIG. 9 shows operations of green light source exposure head control section 1241G, and when G timing signal S-G is received from the synchronization control section 1242, transmission of image bit data (MSB) for one line to green light source exposure head 1230G is started, and a series of one line recording operations mentioned above are conducted for the period of recording operation time tg based on operation clock CLK-G. After that, the state on standby is kept until the following timing signal S-G is received. Incidentally, the same operations as in the foregoing are conducted for red and blue colors. Further, the control shown in FIG. 9 is of the arrangement wherein emission is conducted with enable time corresponding to the density value assigned to each bit.

A recording cycle for one line is represented by t0 which is set, in this case, to 2.82 msec as the occasion to give exposure at pixel density of 300 dpi to photographic paper Pa which is being conveyed at constant speed of 30 mm/sec.

In a cycle of t0, the synchronization control section 1242 sends each of timing signals S-R, S-G and S-B to each of exposure head control sections 1241R, 1241G and 1241B for each recording of one line to conduct synchronization control of three colors for each one line.

Figure 10:
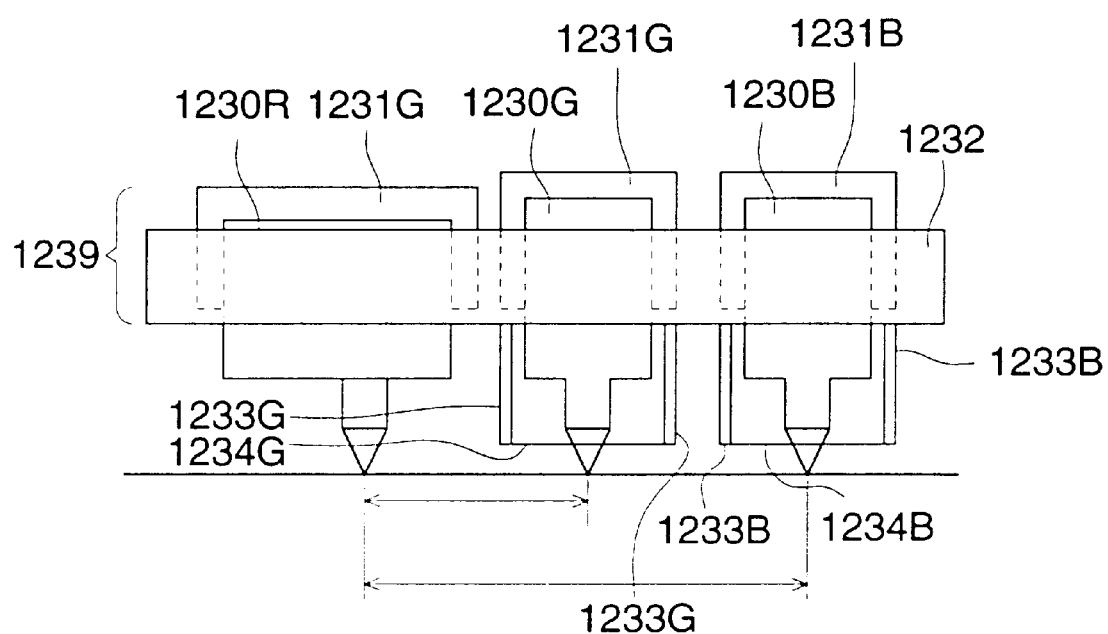
FIG. 10 is a diagram showing that a light source for each exposure head is attached on a unit to be in parallel with a direction of conveyance for a photographic paper conveyed at constant speed.

In this case, each light source is mounted on unit 1239 so that it is arranged in parallel at intervals shown in FIG. 10 in the conveyance direction for photographic paper PaP conveyed at constant speed. Namely, green light source exposure head 1230G and blue light source exposure head 1230B have head gaps respectively of d1+(¼) pixels and d2 pixels, for red light source exposure head 1230R. In this case, d1 and d2 represent an integer, and it is indicated that green light source exposure head 1230G is shifted from an integral multiple by ¼ pixels, though blue light source exposure head 1230B has a head gap of an integral multiple of a recording pixel pitch in the conveyance direction (for example, about 85 μm in the case of 300 dpi).

(Processing flow for image data)

Next, there will be explained a processing flow covering the period from input of image data in exposure head control section 1339 to exposure for photographic paper Pa.

Figure 11:
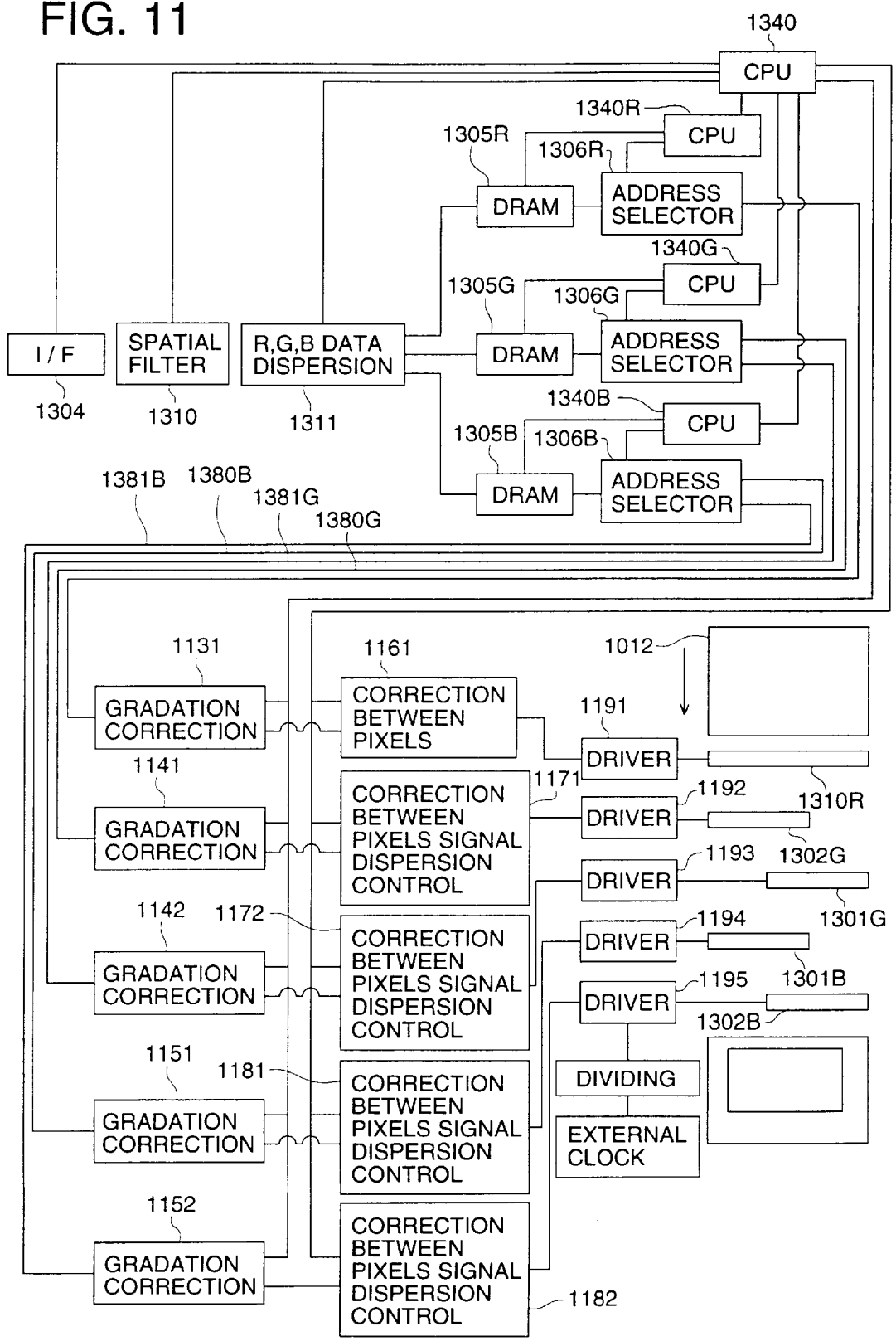
FIG. 11 is a diagram showing an outline of an exposure head control section.

FIG. 11 is a diagram showing an outline of the exposure head control section 1339.

When recording on color photographic paper Pa an image having 3224 pixels at resolution of 300 dpi in the main scanning direction and having 4960 pixels at also 300 dpi in the sub-scanning direction, image data for 3224×4960 pixels are inputted in I/F 304 for each coloring matter. However, the number of pixels in the main scanning direction can be adjusted by changing the number of overlapping recording elements of an exposure head in the connecting section for the exposure head.

From the I/F 304, correction values such as sharpness conversion, correction between pixels, signal distribution and gradation correction, clearances between exposure heads, pixel difference of exposure head in the direction of line and data of overlapped recording elements (the number of overlapped pixels) in the connection section of exposure heads are inputted in CPU 1340 in addition to image data. Then, sharpness conversion of image data is changed by spatial filter 1310 when sharpness conversion values are sent to the spatial filter 1310 from the CPU 1340 for each color of R, G and B when necessary, and red, green and blue image data are stored respectively in DRAM 1305R, DRAM 1305C and DRAM 1305B through respective data distribution circuit 1311 for R, G and B.

Next, data corresponding to one line in accordance with conveyance position (amount of conveyance of color photographic paper Pa) among image data for red color stored in DRAM 1305R are taken out by address selector 1306R for red color from an address corresponding to the DRAM 1305R, and are sent to gradation correction circuit 1131. With regard to image data for green color and image data for blue color, they are divided respectively by address and bus selector 1306G for green color and address and bus selector 1306B for blue color into image data 1380G and 1380B each corresponding to 2560 pixels from the forefront address of image data for one line for each color and into image data 1381G and 1381B each being advanced from the forefront address of image data corresponding to one line by the number of a difference of pixels in the line direction of the exposure head (each corresponding to one obtained by subtracting image data corresponding to pixels in the connection section of the exposure head from each of the image data 1380G and 1380B), and image data 1380G and image data 1380B are sent respectively to gradation correction circuits 1141 and 1151, while image data 1381G and image data 1381B are sent respectively to gradation correction circuits 1142 and 1152. Even with regard to positional deviation in the conveyance direction for exposure heads 1301R, 1301G, 1302G, 1301B and 1302B for R, G and B, images for each color can be recorded without being deviated, when the same processing as in the foregoing is conducted.

Incidentally, these flows are controlled by CPU 1340R, CPU 1340G and CPU 1340B each representing CPU provided for each color. With regard to image data for one line for each of these colors, when they are caused to flow through gradation correction circuits 1131, 1141, 1142, 1151 and 1152 at need, the gradation correction controls, in accordance with gradation correction values sent from CPU 1340, the circuit for correction between pixels 1161 and control circuits for correction between pixels and signal distribution 1171, 1172, 1181 and 1182, and thereby the correction between pixels and signal distribution to plural exposure heads for each color are conducted, in accordance with gradation correction values and values for correction between pixels sent from CPU 1340.

After that, image signals which have been subjected to correction between pixels are supplied to driver 1191 representing an image signal supplying means, and image signals which have been subjected to correction between pixels and to signal distribution are supplied to drivers 1192, 1193, 1194 and 1195. Further, in accordance with signals of the transmitted image data, an amount corresponding to the positional deviation at the initial portion in the conveyance direction and that corresponding to the positional deviation at the last portion in the conveyance direction are supplemented by supplying 0 data in quantity corresponding to each line from CPU 1340R, 1340G and 1340B each controlling for each color, thus, photographic paper Pa is exposed to each color by an exposure head.

If the data of correction between pixels stated above are represented by a value which corrects, when it is multiplied by image data, the dispersion in an amount of emission for each element, multiplication with an inclination coefficient stated later makes it unnecessary to divide a correction circuit into a circuit for correction between pixels and a circuit for distribution of signals, which results in cost reduction.

When calculating a value of correction between pixels, it is preferable to turn off the power supply for arrays other than the arrays to be calculated. However, when two arrays for exposure to the same color are arranged in parallel to be staggered in the main scanning direction, it is possible to determine the correction value wherein an influence of an after-image is considered, by determining the value of correction between pixels in the state wherein sub-exposure on one side is given.

By employing the aforesaid arrangement wherein the correction value of image data is established based on the result of detection of an amount of light for each recording element, conditions for driving a recording element for original image data are changed as a result. Namely, even when emission time (exposure time) for image data is made to be constant, if emission time is determined after the original image data are corrected to image data wherein emission time is established to be longer when a fall of an amount of light is detected, for example, the emission time is extended by the amount to supplement the fall of an amount of light, as a result, and thereby, initial exposure energy for image data can be ensured.

In this case, it is also possible to employ an arrangement to cope with a change in an amount of light by changing characteristics of emission time for image data. Further, a change of driving conditions for supplementing a change in an amount of light is not limited to the change of the emission time (exposure time) mentioned above. For example, it is also possible to arrange so that exposure energy in target may be obtained in the same emission time by changing driving voltage and driving current for an exposure head.

(How to prepare inclination coefficient)

Next, how to prepare the inclination coefficient will be explained as follows, referring to FIG. 12. It is possible to prevent sharpness deterioration caused by positional deviation of an element in the longitudinal direction of an exposure head, namely by positional deviation of recording element 12001 of second exposure head 1321 in the longitudinal direction of the exposure head. With regard to the sharpness deterioration caused by positional deviation of a recording element, an amount of positional deviation of a recording element up to −0.025− +0.025 mm in the case of resolution of 300 dpi is allowed on an experimental basis in human visual sense.

Further, extreme discontinuity of density can be prevented by the size of overlapping section of not less than 100 pixels at resolution of 300 dpi, namely, by the size of overlapping section of about 8 mm or more, and it is possible to perform image recording which does not make a difference of gradation reproduction to be sensed, by the size of 200 pixels or more, namely, about 16 mm or more, and more preferably by the size of 600 pixels or more, namely, 50 mm or more, thus, positional deviation of a recording element up to 0.05 mm can be allowed in human visual sense.

Unless a position of each exposure head and an amount of emission of each exposure head have been adjusted precisely, white streaks or black streaks appear on the recorded image after exposure.

(How to calculate output signals of each recording element)

Next, there will be explained in the following items S-1–S-10 the correction between pixels in the case of recording image data in 256 gradation and a method to obtain output signal Sx of each recording element after signal distribution.

(S-1)

First, an adjustment of a focused point is carried out after either one of parallelism adjustment between exposure heads and deviation adjustment between exposure heads in the direction of arrangement of emission sections is conducted. By carrying out an adjustment of a focused point after adjusting at least one of parallelism adjustment between exposure heads and deviation adjustment between exposure heads in the direction of arrangement of emission sections, it is possible to adjust a focused point simply and surely.

Figure 13:
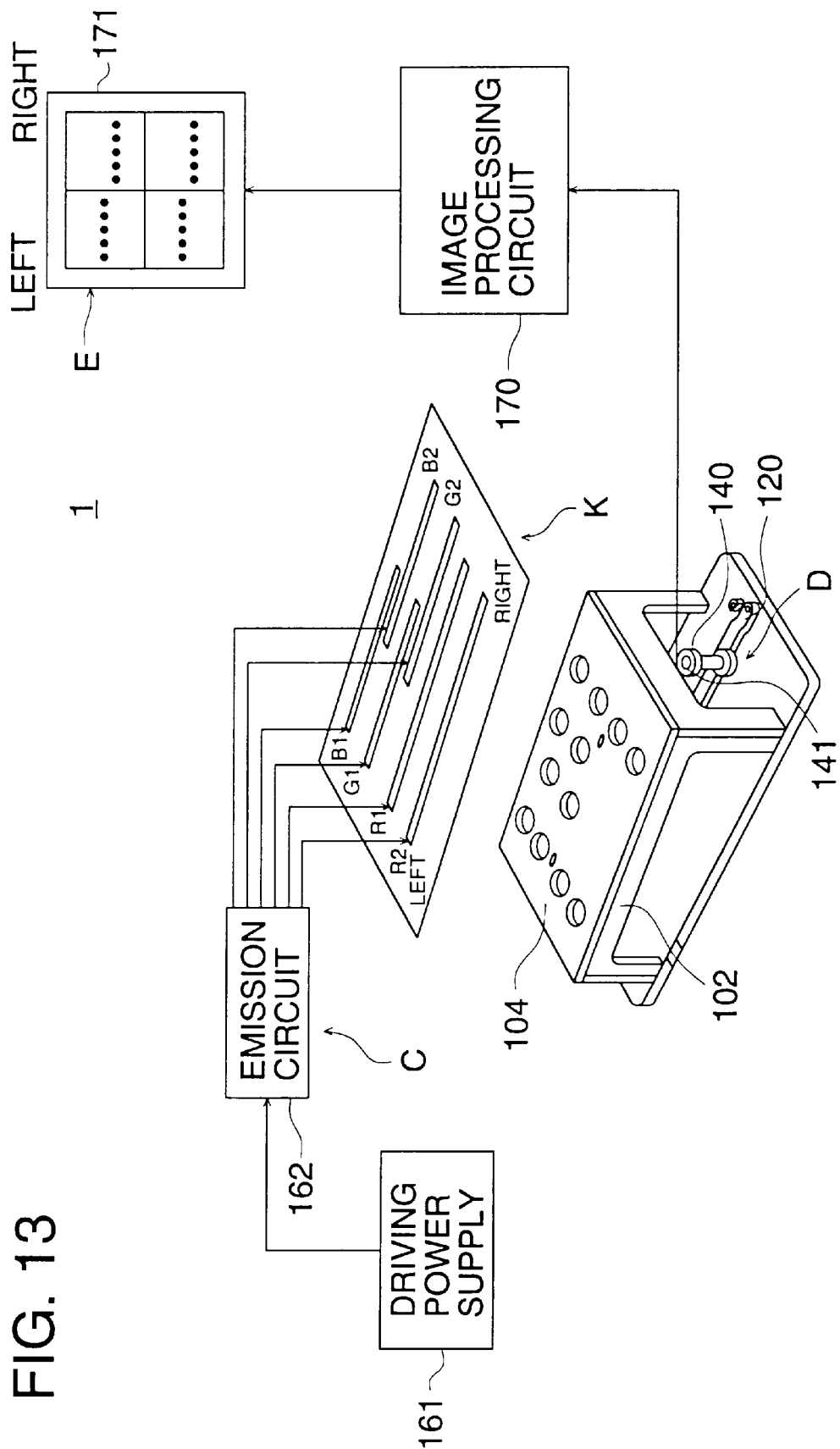
FIG. 13 is a diagram showing an emission drive means for an exposure unit assembling equipment and a display means.
Figure 14:
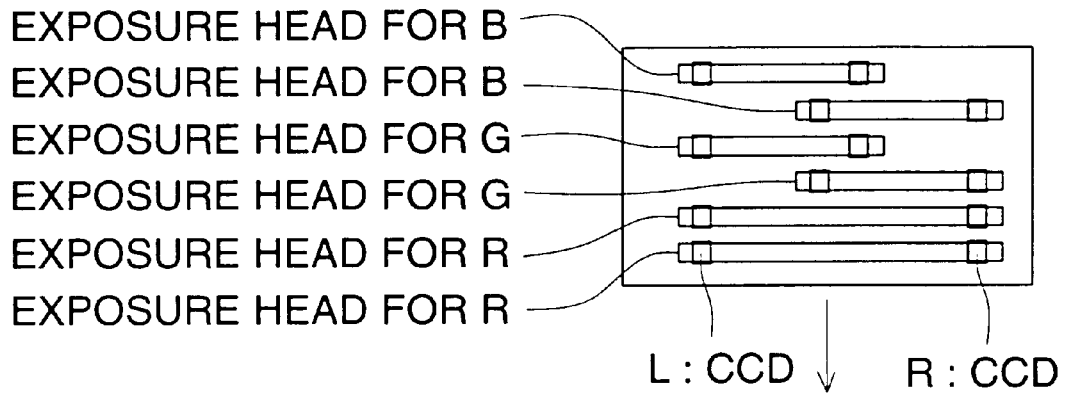
FIGS. 14(a) to 14(c) are diagrams showing focus point position adjustment and parallelism adjustment.
Figure 14:
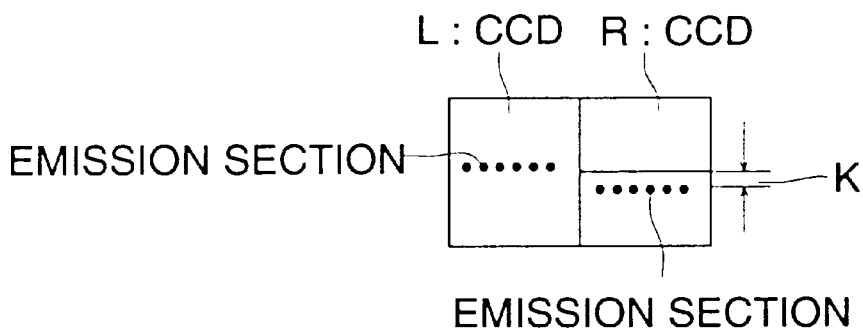
Figure 14:
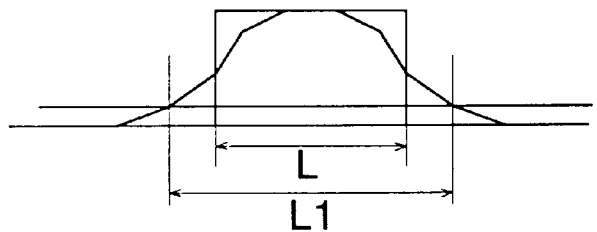
Figure 15:
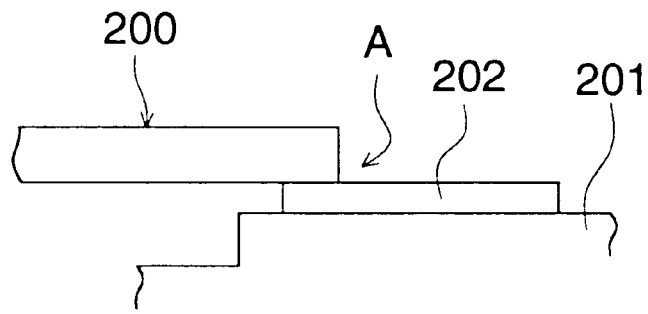
FIGS. 15(a) to 15(c) are diagrams showing a focus point position adjusting means.
Figure 15:
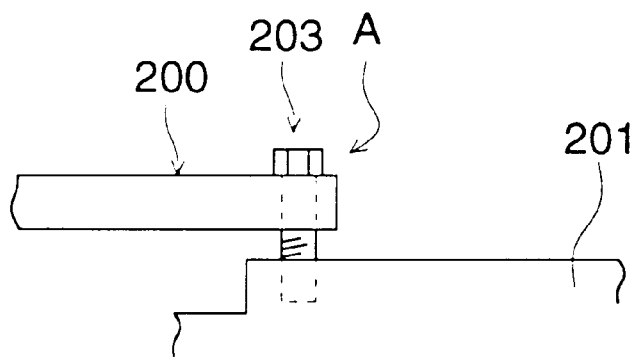
Figure 15:
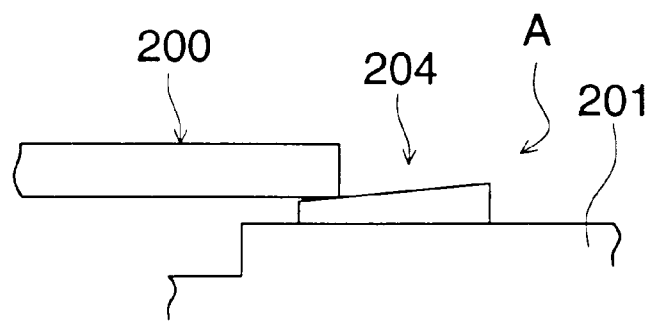
Figure 16:
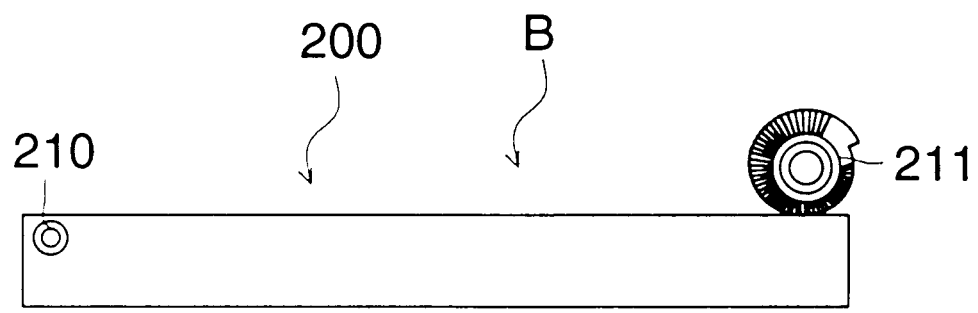
FIG. 16 is a diagram showing a parallel position adjusting means.

The positional adjustment of the exposure head stated above will be explained with reference to FIGS. 13–16. FIG. 13 is a diagram showing an emission driving means and a display means of an exposure unit assembly equipment, FIG. 14 is a diagram showing focusing adjustment and parallelism adjustment, FIG. 15 is a diagram showing a focused point adjusting means, and FIG. 16 is a diagram showing a parallel position adjusting means.

Exposure unit assembly equipment 1 is provided with a focused point adjusting means A (shown in FIG. 15) which adjusts a focused point of an exposure head, a parallel position adjusting means (shown in FIG. 16) which adjusts a parallel position of the exposure head, emission driving means C which makes an emission section of the exposure head to emit light, image pickup means D which picks up images of emission of emission section of the exposure head at plural positions, and with display means E capable of conducting screen display for plural images picked up at plural positions. The assembly equipment is arranged so that a focused point of an exposure head can be adjusted by focused point adjusting means A in a way that an image to be photographed at an emission section can be focused, and a parallel position of the exposure head can be adjusted by parallel position adjusting means B in a way that plural displayed emission sections on a photographing screen can be arranged in a form of the straight line.

As shown in FIG. 13, when photographing emission of an emission section of an exposure head for R, for example, of exposure unit K with CCD 140, the exposure unit K is placed on upper plate 104 of measuring stand 102. Under this condition, a glass plate covering the emission section of the exposure head for R comes in contact with optical fiber plate 141 of CCD 140, and thereby, the optical fiber plate 141 can be brought into close contact with the glass plate. It is arranged so that an image forming position of the emission section of the exposure head is located on the contact plane between the glass plate and CCD 140, whereby, the CCD 140 constituting an image pickup means can receive emission of the emission section of the exposure head accurately, which results in an improvement of image pickup accuracy.

(S-2)

Emission driving means C which makes an emission section of an exposure head to emit light is composed of driving power supply 161 and emission circuit 162 as shown in FIG. 13, and it makes an emission section of an exposure head to emit light. Image pickup means D which picks up images of emission of the emission section of the exposure head at plural positions is composed of CCD 140, and image signals from CCD 140 are subjected to image processing at image processing circuit 170, thus, photographed images of the emission of the emission section are displayed on the screen of CRT 171 which constitutes display means E.

(S-3)

The display means E is displayed as shown in FIG. 13. Namely, as shown in FIG. 14(*a*), CCD on the left side and CCD on the left side are arranged respectively for an exposure head, and photographed images obtained from the CCD on the left side and from the CCD on the left side are displayed as shown in FIG. 14(*b*) and FIG. 14(*c*).

In the display in FIG. 14(*c*), a quantity of light is displayed with a density characteristic curve, and a focused point of an exposure head is adjusted by focused point adjusting means A so that width L1 of the density characteristic curve may be made to be minimum width L, namely, so that the photographed image of the emission section can be focused.

(S-4)

In the display in FIG. 14(*b*), image pickup screen is split to right and left, coping with CCD on the left side and CCD on the left side, to be displayed, and when display on the right and that on the left in a position of an emission section on photographed images are deviated by width K, a parallel position of an exposure head is adjusted by parallel position adjusting means B so that positions of emission sections on the photographed images may be arranged in a form of a straight line.

Further, it is also possible to display a line or a grid representing a standard on an image plane and thereby to adjust a parallel position of an exposure head with parallel position adjusting means B so that photographed images may be in parallel with this line or grid, or it is possible to adjust a parallel position of an exposure head so that photographed images may be made to be in parallel based on the line or the grid.

(S-5)

FIG. 15 shows the structure of a focused point adjusting means, and FIG. 15(*a*) shows the structure wherein a focused point can be adjusted by spacer 202 having a different thickness which is located between exposure head 200 and exposure head holding member 201. Owing to the in-between spacer having a different thickness, a focused point can be adjusted surely by the simple structure.

FIG. 15(*b*) shows the structure wherein it is possible to adjust a focused point by changing the distance between exposure head 200 and exposure head holding member 201 with screw mechanism 203. It is possible to adjust a focused point surely with a simple structure by changing with the screw mechanism 203.

FIG. 15(*c*) shows the structure wherein a focused point can be adjusted by wedge 204 which is located between exposure head 200 and exposure head holding member 201. Owing to the in-between wedge 204, a focused point can be adjusted surely by the simple structure.

(S-6)

FIG. 16 shows the structure of a parallel position adjusting means wherein rotary center screw 210 is provided on an edge on one side of exposure head 200 and adjusting cam 211 which moves the exposure head 200 in parallel is provided on an edge on the other side so that a parallel position of the exposure head 200 is adjusted in a way that plural photographed images obtained through image pickup at plural locations may be arranged in a form of a straight line.

(S-7)

After the parallel position is adjusted finally, focusing is checked again. When a focused point is out of focus in this case, the focused point is adjusted to the optimum position.

In exposure unit assembly equipment 1, a focused point of exposure head 200 can be adjusted by focused point adjusting means A so that a focused point of a photographed image of an emission section is adjusted as stated above, and a parallel position of the exposure head can be adjusted easily in a short period of time by adjusting a parallel position of the exposure head 200 with parallel position adjusting means B so that positions of emission sections on a photographed image plane may be arranged in a form of a straight line, which makes it possible to improve accuracy of parallelism of an exposure head and to cause an exposure head holding member to hold an exposure head.

It is further possible to adjust deviation in the direction of emission section arrangement between exposure heads by shifting the exposure head 200 in the direction of emission section arrangement.

A test pattern is subjected to exposure conducted by the exposure head adjusted in (S-1)–(S-7), then, the test pattern is developed and processed to make prints so that focusing and parallelism are checked. If the focusing and parallelism are prescribed ones, the sequence advances to the next step, while when the prescribed focusing and parallelism are not obtained, readjustment is conducted.

After that, correction between pixels mentioned above is conducted, and an emission level of a recording element constituting each emission section is adjusted.

Figure 21:
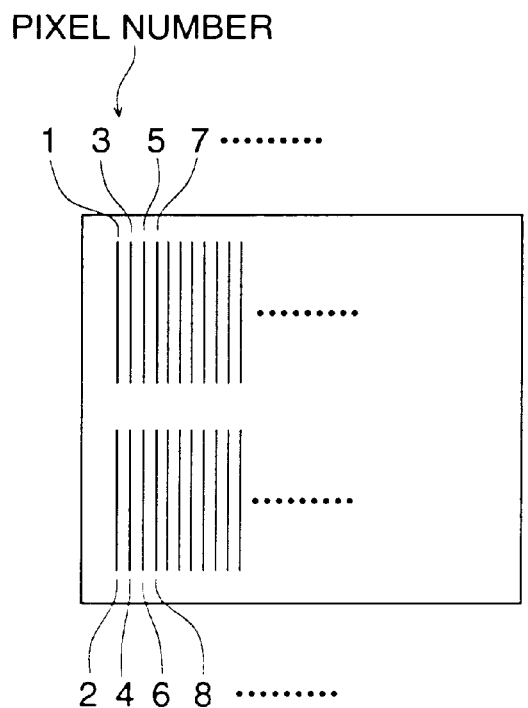
FIGS. 21(a) and 21(b) are diagrams showing a test pattern for confirming exposure.
Figure 21:
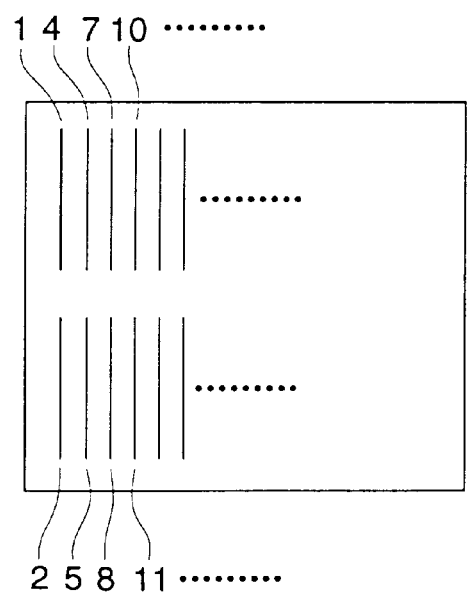

As a test pattern for confirming exposure, an image wherein pixels are separated into one pixel or two pixels as shown in FIG. 21 is preferably used as an image to confirm focusing.

With regard to exposure heads for G and R, an image wherein pixels are separated into one pixel is preferable because human visual characteristics are excellent. With regard to exposure head for B, however, an image wherein pixels are separated into two or more pixels is preferable because discrimination by human visual characteristics is difficult.

(S-8)

Figure 17:
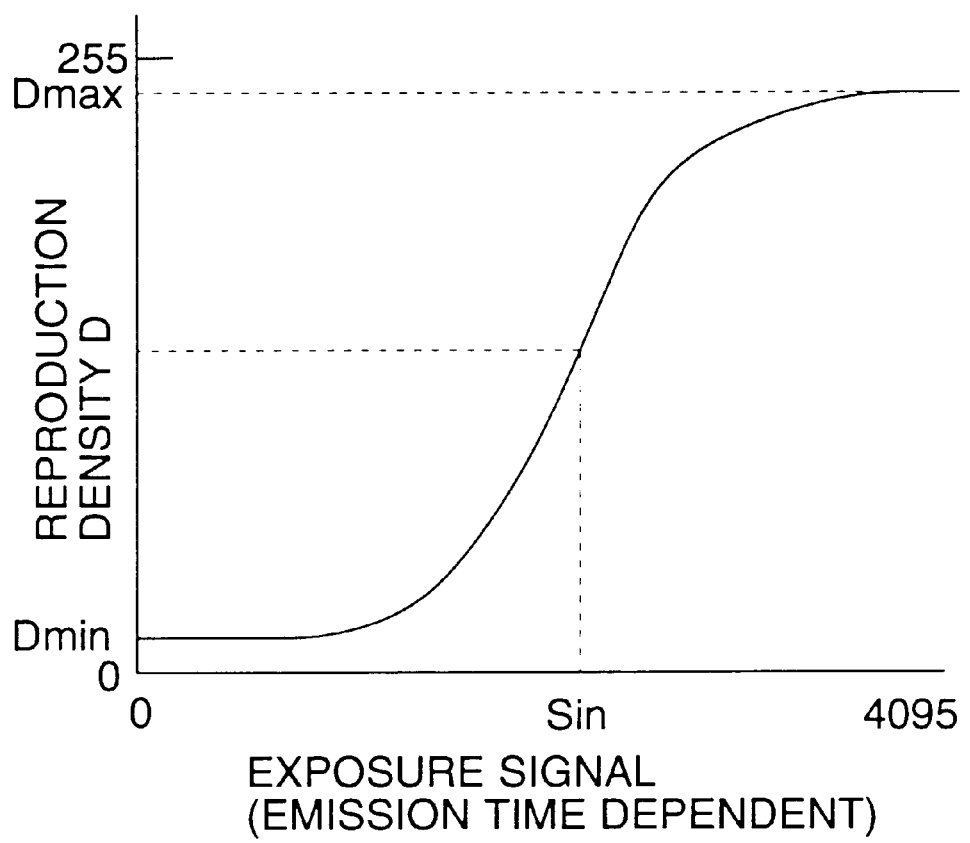
FIG. 17 is a diagram showing how to obtain Sin values from a Sin-D curve.

Sin-D curve representing the relation between exposure signal (Sin) representing output signal of each recording element shown in FIG. 17 and density (reproduction density D) of photographic paper Pa representing a light-sensitive material is obtained for each recording element of each exposure head.

(S-9)

Maximum value Dmax of reproduction density D is defined, then, the reproduction density D is divided into 256 density steps (8 bit), and exposure signal Sin corresponding to each step (corresponding to exposure time in this case) is obtained from FIG. 17 showing a Sin-D curve obtained in (S-7).

(S-10)

Figure 18:
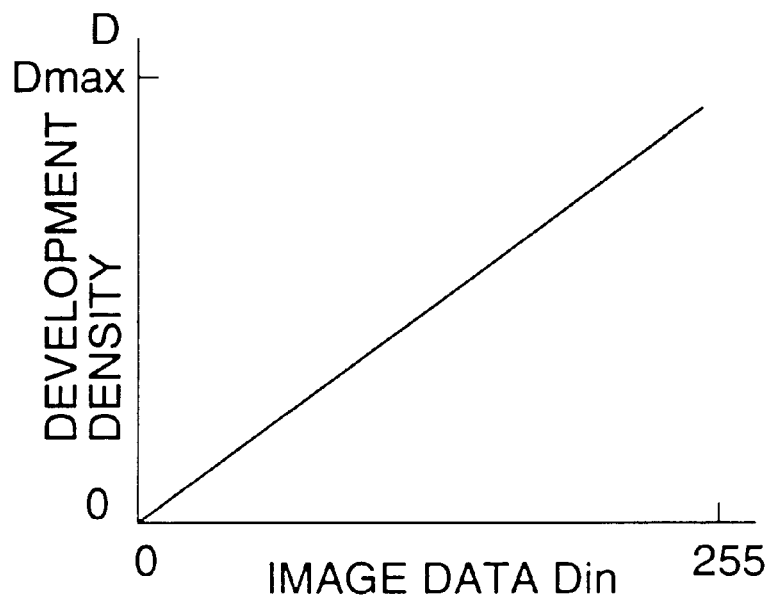
FIGS. 18(a) and 18(b) are diagrams showing that it is possible to change image data Din by considering it to be corresponded to a logarithm of an exposure amount.
Figure 18:
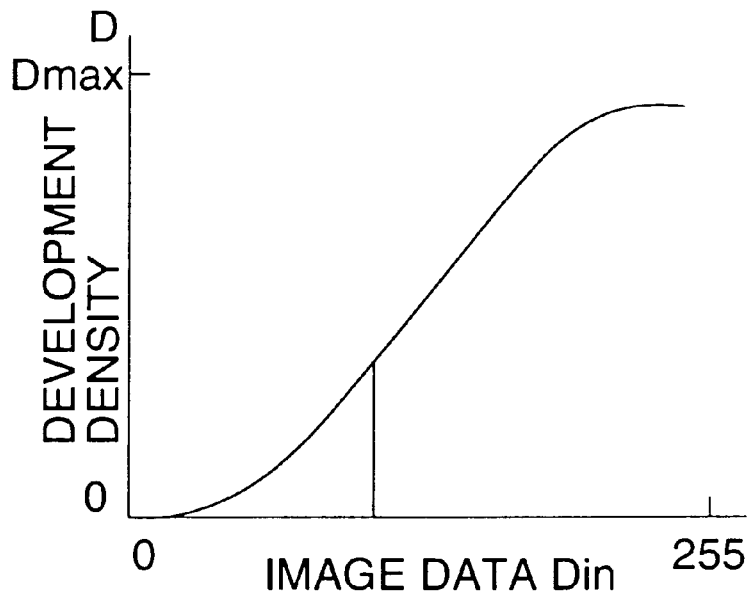

A Din-D curve is prepared so that arbitrary reproduction density D may be obtained for image data Din, and a value of Sin is obtained from the Sin-D curve in FIG. 17. By preparing this for 0–255 of Din, a gradation conversion table is prepared. Incidentally, the Din-D curve may be made to be linear for input signal Din as shown in FIG. 18(*a*), or it may be changed as shown in FIG. 18(*b*) in accordance with characteristics of a silver halide light-sensitive material representing a recording medium, considering that Din corresponds to a logarithm of an exposure amount.

(S-11)

Output signal Sx of each recording element after correction between pixels and signal distribution is obtained from the following expression.

Din: 8 bit→Sin: 12 bit (by gradation conversion table)

Sx=Sin x inclination coefficient x data of correction between pixels

However, Sx has resolving power of 4096 levels from 0 to 4095.

This gradation conversion table is established so that two Din-D curves may be the same each other when there are two or more exposure heads for one color.

Further, it is also possible to establish a gradation correction value for one exposure head before recording so that image data reproduction density characteristics for two exposure heads may agree with each other, and thereby to establish reproduction density for image data with a value of correction between pixels.

As a final adjustment of an image output apparatus, a position to start recording for each exposure head is adjusted. As shown in FIG. 22, a standard image wherein recording timing is changed from the standard by one line is outputted.

This standard image is formed on an image recording medium as shown in FIG. 22 in accordance with standard image forming data stored in external storage media such as a floppy disk, a magnet-optic disk and a memory card, or in memories such as a hard disk in an apparatus, RAM and ROM. In FIG. 22 (1), there are shown those obtained through exposure and recording by shifting in the main scanning direction while changing an amount of establishment of exposure timing for the exposure head for R color to 13 steps from −6 to +6, with exposure timing of the standard exposure head, namely, the specific exposure head, for example, the exposure head for G color serving as a standard, and those obtained through exposure and recording by changing an amount of establishment for the exposure head for B color, with the exposure head for G color serving as a standard in the same way as in the foregoing.

In this case, in the illustrated example, the exposure head for R color agrees with the exposure head for G color in terms of a position for exposure and recording in the sub-scanning direction at the adjustment amount of −1, and the exposure head for B color agrees with the exposure head for G color in terms of a position for exposure and recording in the sub-scanning direction at the adjustment amount of +3. In FIG. 22(2), there are shown those obtained through simultaneous exposure and recording by shifting in the main scanning direction while changing an amount of establishment of exposure timing for the exposure head for G and the exposure head for B color to 13 steps from −6 to +6, with exposure timing of the exposure head for R color serving as a standard.

In the illustrated example, the exposure head for G color agrees with the exposure head for R color in terms of a position for exposure and recording in the sub-scanning direction at the adjustment amount of −2, and the exposure head for B color agrees with the exposure head for R color in terms of a position for exposure and recording in the sub-scanning direction at the adjustment amount of +3. In this case, a position of a length in the main scanning direction for each color may be of the system where the length is totally overlapped, or the length is partially overlapped, or the length is not overlapped at all, in a proximity area. This applies also to the standard image for the main scanning direction which will be stated later.

Now, based on data of measurement conducted visually or by means of a scanner for the standard image obtained in the aforesaid method, an establishment amount of exposure timing is changed by the nearest value. When assuming that initial values are 100, 200 and 300 respectively for R, G and B, for example, the occasion of FIG. 22 (1) results in R=100−1=99 G=200 (standard constant) B=300+3=303, and the occasion of FIG. 22 (2) results in R=100 (standard constant) G=200−2=198 B=300−3=297 in the same way. After changing the established value for the exposure head for the color other than the standard color in the aforesaid way, it is also possible to form the standard image again for confirming that ±0 makes the nearest value. Adjustment of color doubling in the main scanning direction is also conducted in the same method as in the foregoing.

(Adjustment of emission unit time (emission time))

When plural exposure heads are conveyed by plural conveyance means, the conveyance speed of each conveyance means sometimes differs from others and positional deviation is sometimes caused if exposure and recording are conducted without taking any actions. To prevent this problem, the writing timing based on exposure which matches each conveyance means is used. This is meant by the adjustment of emission unit time.

Adjustment of emission unit time will be explained based on an image recording apparatus shown in FIG. 23 which employs a conveyance roller as a conveyance means.

Main portion 1 of the image recording apparatus has therein feed-out section 3 which can feed out light-sensitive materials P1 and P2 side by side in the lateral direction from light-sensitive material rolls contained respectively in plural and separate magazines, cutting section 4 which cuts plural light-sensitive materials P1 and P2, conveyance section 6 which can convey plural light-sensitive materials P1 and P2 fed out by the feed-out section 3 side by side in the lateral direction to the exposure area, and exposure section 7 by which the light-sensitive material conveyed to the exposure area is exposed to light based on exposure image data so that a latent image is recorded. The feed-out section 3 is one which can feed out each of light-sensitive materials P1 and P2 from each of rolls respectively for light-sensitive material P1 and light-sensitive material P2 contained in plural magazines 11 and 12, independently of each other. Due to this, it is possible to make plural light-sensitive materials P1 and P2 arranged side by side to be different in terms of length, by making the timing to start feeding out light-sensitive material P1 to be different from that to start feeding out light-sensitive material P2. Thus, light-sensitive material P1 is fed out of the light-sensitive material roll contained in magazine 11 by an unillustrated magazine driving section which drives magazine 11 to feed a light-sensitive material out of the magazine 11, the first paired feed-out rollers which are composed of the first feed-out driving roller 31 and the first feed-out driven roller 32 and convey the light-sensitive material P1 fed out of the magazine 11, and the second paired feed-out rollers which are composed of the second feed-out driving roller 33 and the second feed-out driven roller 34 and convey the light-sensitive material P1 conveyed by the first paired feed-out rollers.

Light-sensitive material P2 is fed out of the light-sensitive material roll contained in magazine 12 by an unillustrated magazine driving section which drives magazine 12 to feed a light-sensitive material out of the magazine 12, the first paired feed-out rollers which are composed of the first feed-out driving roller 36 and the first feed-out driven roller 37 and convey the light-sensitive material P2 fed out of the magazine 12, and the second paired feed-out rollers which are composed of the second feed-out driving roller 38 and the second feed-out driven roller 34 and convey the light-sensitive material P1 conveyed by the first paired feed-out rollers.

Then, the first feed-out driving rollers 31 and 36 and the second feed-out driving rollers 33 and 38 rotate and drive through driving force of each driving motor. Each of the first feed-out driven rollers 35 and 37 and the second feed-out driven rollers 34 and 39 is driven by the feed-out driving roller which is in pressure contact with each of the feed-out driven rollers.

In the feed-out section 3, the second feed-out driven rollers 34 and 39 can be moved vertically, which creates a state wherein the second feed-out driven rollers 34 and 39 are in pressure contact with the second feed-out driving rollers 33 and 38 and can nip a light-sensitive material together with the second feed-out driving rollers 33 and 38 and a state wherein the second feed-out driven rollers 34 and 39 are away from the second feed-out driving rollers 33 and 38.

The cutting section 4 cuts plural light-sensitive materials P1 and P2 which have been fed out at the prescribed cutting position between the position for the first paired feed-out rollers to nip and the position for the second paired feed-out rollers to nip. The cutting section 4 has therein movable blade 41 having a length in the lateral direction covering an entire area in the lateral direction of plural light-sensitive materials P1 and P2 and fixed blade 42.

In the conveyance section 6, there are provided paired conveyance rollers including the first pair to the fifth pair from the feed-out section 3 side, and each pair of conveyance rollers can convey light-sensitive materials P1 and P2 by nipping them side by side in the lateral direction, and the conveyance rollers are composed of conveyance driving rollers 61–65 and conveyance driven rollers 66–70 each extending in the lateral direction.

Exposure section 7 has therein exposure head 71 for blue color, exposure head 72 for green color and exposure head 73 for red color. An exposure area for the exposure head 71 for blue color is a prescribed location between the nipping position for the second paired conveyance rollers composed of conveyance driving roller 62 and conveyance driven roller 67 and the nipping position for the third paired conveyance rollers composed of conveyance driving roller 63 and conveyance driven roller 68. An exposure area for the exposure head 72 for green color is a prescribed location between the nipping position for the third paired conveyance rollers composed of conveyance driving roller 63 and conveyance driven roller 68 and the nipping position for the fourth paired conveyance rollers composed of conveyance driving roller 64 and conveyance driven roller 68.

An exposure area for the exposure head 73 for red color is a prescribed location between the nipping position for the fourth paired conveyance rollers composed of conveyance driving roller 64 and conveyance driven roller 69 and the nipping position for the fifth paired conveyance rollers composed of conveyance driving roller 65 and conveyance driven roller 70.

The main portion 1 has therein detection sensor 51 which detects whether or not light-sensitive material P1 arrives at the prescribed detection position in the conveyance direction between the nipping position for the first paired conveyance rollers composed of conveyance driving roller 61 and conveyance driven roller 66 in conveyance section 6 and the nipping position for the second paired conveyance rollers composed of conveyance driving roller 67 in conveyance section 6, and detection sensor 52 which detects whether light-sensitive material P2 arrives or not.

In the conveyance section 6, the conveyance driven roller 66 of the first paired conveyance rollers can be moved vertically, which creates a state wherein the first paired conveyance rollers composed of conveyance driving roller 61 and conveyance driven roller 66 in conveyance section 6 can nip and convey light-sensitive materials P1 and P2 and a state wherein the conveyance driving roller is away from the conveyance driven roller.

When conveying plural light-sensitive materials P1 and P2 to the exposure area by arranging them side by side in the lateral direction, the main portion 1 operates as shown below. First, the feed-out section 3 feeds out light-sensitive materials P1 and P2 arranged side by side in the lateral direction from the rolls contained in plural magazines 11 and 12 under the condition that the first paired conveyance rollers in conveyance section 6 are away from each other. Then, when detection sensor 51 detects that light-sensitive material P1 fed out by feed-out section 3 arrives at the detection position, a magazine driving section which drives magazine 11 in feed-out section 3, the first feed-out driving roller 31 and the second feed-out driving roller 33 are stopped, and thereby, feeding out of light-sensitive material P1 is stopped. When detection sensor 52 detects that light-sensitive material P2 fed out by feed-out section 3 arrives at the detection position, a magazine driving section which drives magazine 12 in feed-out section 3, the first feed-out driving roller 36 and the second feed-out driving roller 38 are stopped, and thereby, feeding out of light-sensitive material P2 is stopped.

When feeding out of both light-sensitive materials P1 and P2 is stopped, positions of leading edges of plural light-sensitive materials P1 and P2 are aligned more accurately. Conveyance section 6 moves conveyance driven roller 66 downward, which creates the state wherein the first paired conveyance rollers composed of conveyance driving roller 61 and conveyance driven roller 66 in conveyance section 6 nips light-sensitive materials P1 and P2. After that, the cutting section 4 cuts plural light-sensitive materials P1 and P2. After that, the second feed-out driven rollers 34 and 39 of feed-out section 3 are moved upward, and the second paired feed-out rollers are made to be away from each other. After that, paired conveyance rollers of conveyance section 6 nip plural light-sensitive materials P1 and P2 to convey them. Due to this, it is possible to convey plural light-sensitive materials P1 and P2 more easily while keeping the state where the leading edges of plural light-sensitive materials P1 and P2 are aligned more accurately, because plural light-sensitive materials P1 and P2 are conveyed while being arranged side by side under the condition of no tension from feed-out section 3 where separate rollers are provided for plural light-sensitive materials P1 and P2 and from magazines 11 and 12, by conveyance rollers 61–65 and conveyance driven rollers 66–70 extending in the lateral direction, from the state wherein leading edges of plural light-sensitive materials P1 and P2 are aligned more accurately. Therefore, it is possible to prevent that a light-sensitive material which takes the lead is skewed not only in the conveyance section 6 but also in the nip conveyance system in processing section 8 in the later step.

Image control section 2 generates exposure image data from output image data of output image to be recorded on plural light-sensitive materials P1 and P2, on the assumption that leading edges of plural light-sensitive materials P1 and P2 in the exposure area are aligned accurately, and transmits them to exposure section 7 of main portion 1. Then, based on the exposure image data, the exposure section 7 conducts exposure on plural light-sensitive materials P1 and P2 to record a latent image. Therefore, when a light-sensitive material is skewed, deviated images are recorded. However, it is possible to prevent that the light-sensitive material is skewed. Accordingly, excellent latent images can be recorded on plural light-sensitive materials P1 and P2.

Further, since detecting positions of detection sensors 51 and 52 are located between a nipping position of the first paired conveyance rollers and that of the second paired conveyance rollers in conveyance section 6, simple structure and control wherein the first paired conveyance rollers in conveyance section 6 can take the state to nip a light-sensitive material and to convey it and the state wherein the conveyance rollers are apart from each other make it possible to convey while keeping the state wherein leading edges of plural light-sensitive materials P1 and P2 are aligned accurately.

Figure 23:
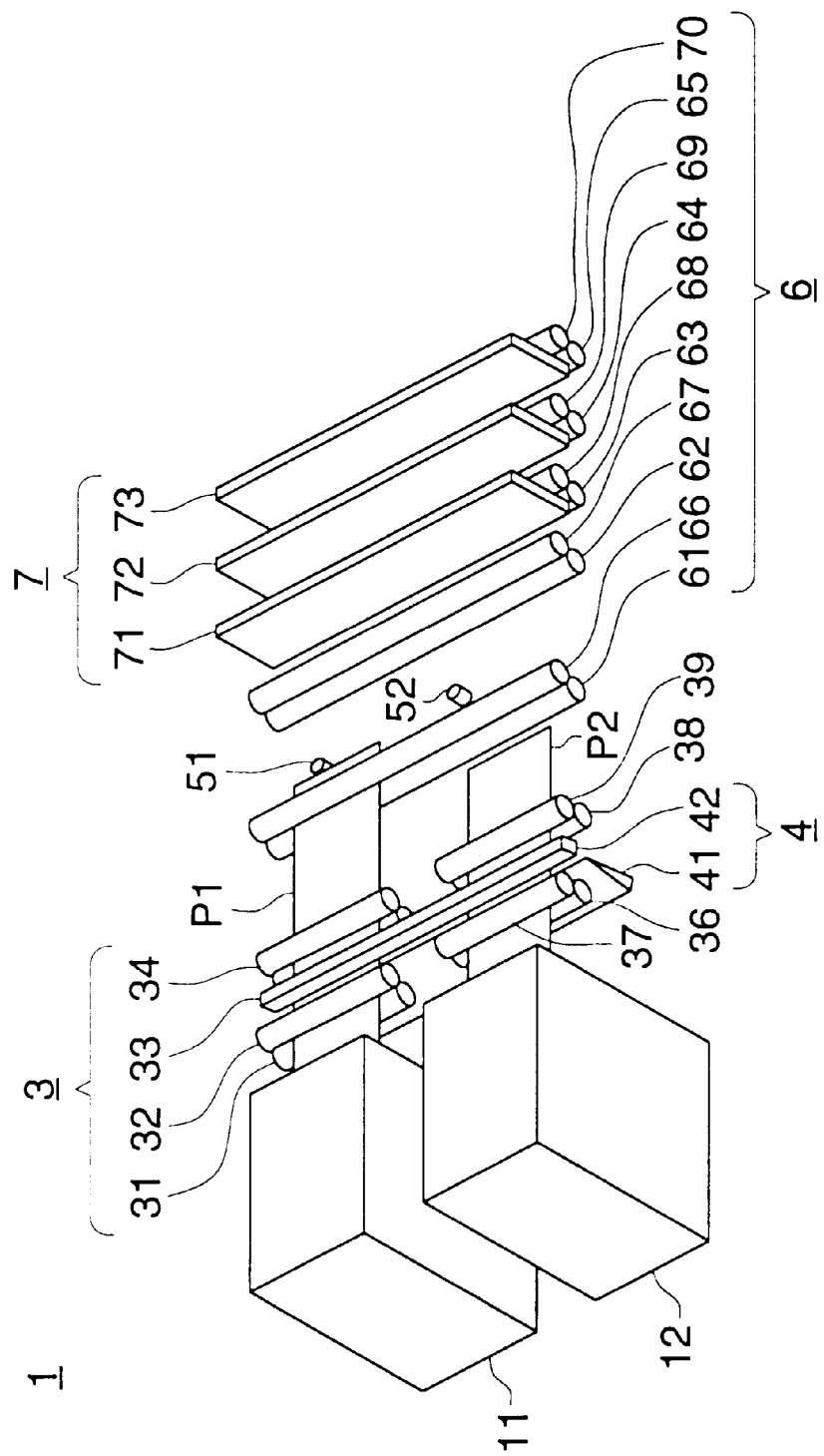
FIG. 23 is a perspective view showing an embodiment of an image recording apparatus.
Figure 24:
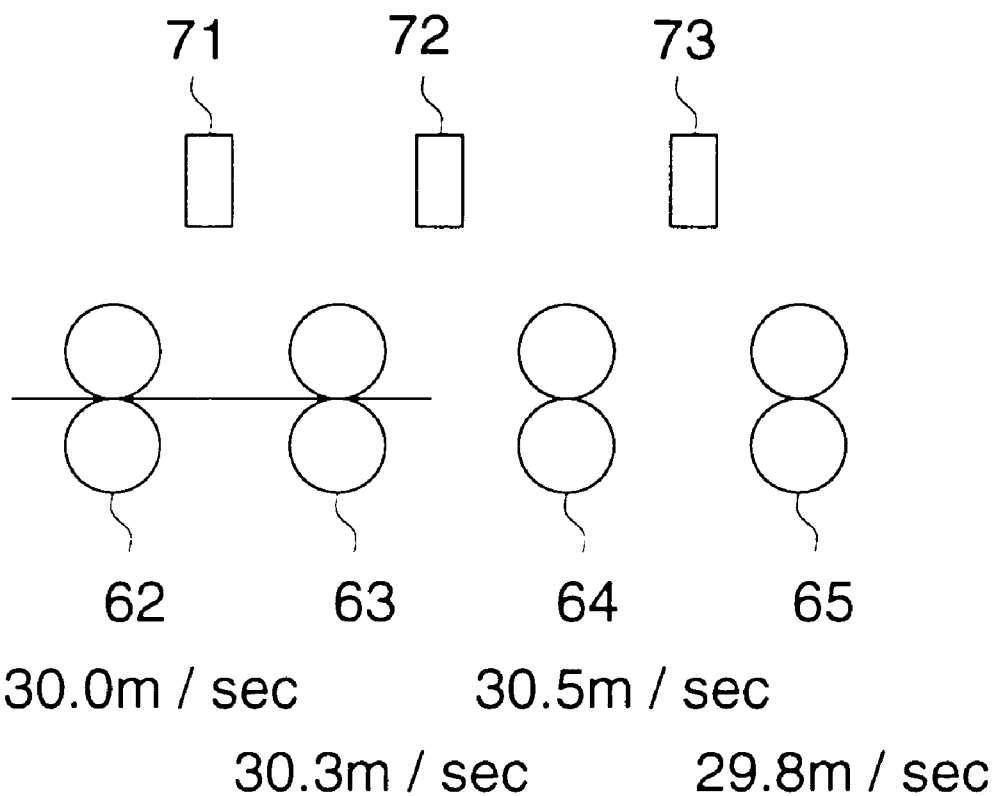
FIG. 24 is a diagram illustrating adjustment of emission unit time.

On the assumption that exposure head for blue light 71, exposure head for green light 72 and exposure head for red light 73 are the same in terms of emission unit time in the image recording apparatus shown in FIG. 23, when exposure and recording are conducted under the condition that conveyance rollers 62, 63, 64 and 65 respectively have different speeds of 30 mm/sec, 30.3 mm/sec, 30.5 mm/sec and 29.8 mm/sec, positional deviation is sometimes caused. For example, when writing with exposure at 300 dpi is realized at the conveyance speed of 30 mm/sec and the writing speed of 2.8 msec/line, if exposure head for blue light 71, exposure head for green light 72 and exposure head for red light 73 are of the same timing (emission unit time) as shown in FIG. 24, images outputted by the exposure head for blue light 71, the exposure head for green light 72 and the exposure head for red light 73 are made longer or shorter depending on the conveyance speed in the course of exposure.

Figure 25:
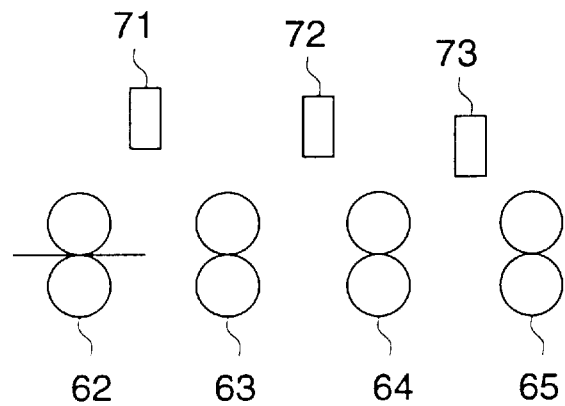
FIGS. 25(a) to 25(c) are diagrams illustrating adjustment of emission unit time.
Figure 25:
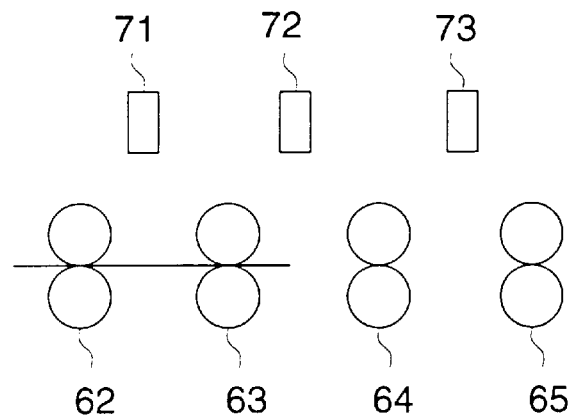
Figure 25:
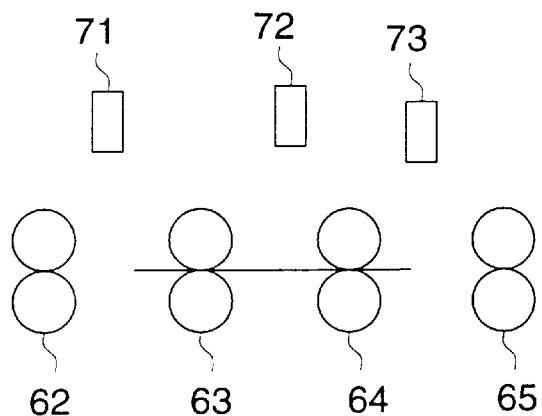

Recording positions for the exposure head for blue light 71, the exposure head for green light 72 and the exposure head for red light 73 are also made to be unaligned at the trailing edge of output even if the leading edges of output are aligned temporarily. Therefore, emission unit time for each of the exposure head for blue light 71, the exposure head for green light 72 and the exposure head for red light 73 is changed as shown in FIG. 25 in accordance with conveyance speeds of conveyance rollers 62, 63, 64 and 65.

Namely, a change is made to 2.8 msec when conveying with conveyance roller 62, a change is made to $(30/30.3) \times 2.8 = 2.772$ msec when conveying with conveyance roller 63, a change is made to $(30/30.5) \times 2.8 = 2.754$ msec when conveying with conveyance roller 64, and a change is made to $(30/29.8) \times 2.8 = 2.819$ msec when conveying with conveyance roller 65.

In an adjusting method, images for every 20 lines at the unit of exposure head (exposure head for blue light 71 in the afore-said example) for the first exposure are outputted, and a distance for the recording is measured for calculation.

As shown in FIG. 26, an emission time unit is changed by calculating speed ratios for ratios 63, 64 and 65 with a standard of ratio 62. When a paper is short, there naturally is no output for ratios 64 and 65 as shown in FIG. 26 (output of exposure head for blue light 71 can be for the occasion of only conveyance rollers 62 and 63). Therefore, results of output of exposure head for green light 72 and exposure head for red light 73 are used for ratios 64 and 65 for convenience. Even in this case, however, a ratio is calculated from the output results.

(Exposure unit)

As an actual manufacturing flow, an exposure unit in which an exposure head is incorporated is made first, and during that period, parallelism and deviation of the exposure head are adjusted by CCD as shown in FIGS. 13–16. This adjustment of parallelism and deviation of the exposure head is not for each pixel but is rough adjustment in which deviation of about 0.3 pixels, for example, is allowed without aligning them. The point is to adjust for the purpose of preventing an outbreak of unexposable areas caused on a light-sensitive material by the deviation, and then to conduct focused point adjustment, and up to this point, no exposure is conducted.

After these adjustments in FIGS. 13–16, the exposure unit is incorporated in the image recording apparatus, and the following adjustments are conducted.

(1) Correction of a quantity of light of a pixel (2) Adjustment of a quantity of light between exposure heads (adjustment of color balance in the course of exposure)

(3) Adjustment of a position to start recording

A parallelism adjustment between exposure heads, a deviation adjustment and an adjustment of a position to start emitting will be explained with reference to FIG. 27.

With regard to parallelism between exposure heads, an amount of deviation in terms of the number of lines between exposure heads is confirmed, and information thereof is given to the apparatus. Namely, when assuming that an exposure head is arranged in the direction perpendicular to the conveyance direction for a light-sensitive material, for example, and the main scanning direction is represented by the direction of arrangement of recording elements of the exposure head, as shown in FIG. 27(*a*), adjustment of parallelism between exposure heads is conducted so that plural exposure heads R and G, for example, may be in parallel with each other without having no deviation in the main scanning direction. Plural exposure heads wherein a difference between end portion $1_L$ and end portion $1_R$ is zero are preferable, but in the case of 300 dpi where one pixel is 84.6 μm, a difference within ±40 μm is preferable.

With regard to deviation in the arrangement direction, the position in terms of the number of pixels to start writing (to deviate how many pixels to output) in each exposure head is confirmed, and this information is given to the image recording apparatus. Namely, with regard to adjustment of deviation in the direction of arrangement of emission sections between exposure heads, when assuming that the main scanning direction is represented by the direction of arrangement of recording elements in the exposure head, deviation 1 in the arrangement direction is adjusted because recording elements of plural exposure heads are sometimes shifted in the sub-scanning direction which is perpendicular to the main scanning direction, and those having less deviation in the arrangement direction are preferable.

Owing to this adjustment, exposure and recording which are free from deviation can be conducted, provided that each exposure head is in parallel with others.

Figure 27:
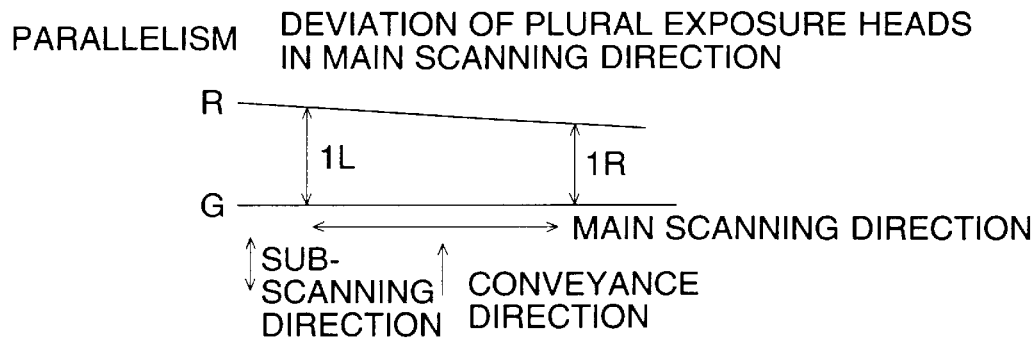
FIGS. 27(a) to 27(d) are diagrams illustrating adjustment of parallelism between exposure heads, adjustment of deviation, and adjustment of a position to start emission.
Figure 27:
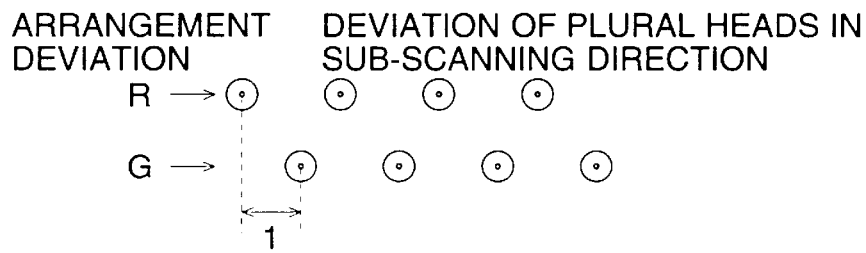
Figure 27:
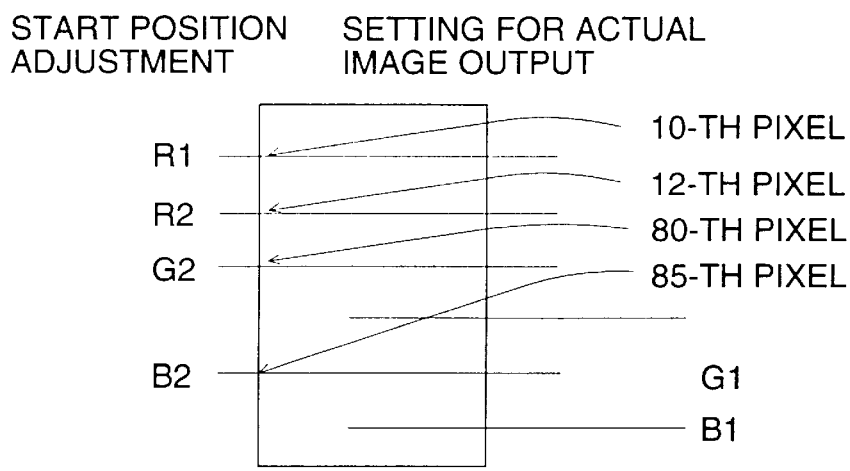
Figure 27:
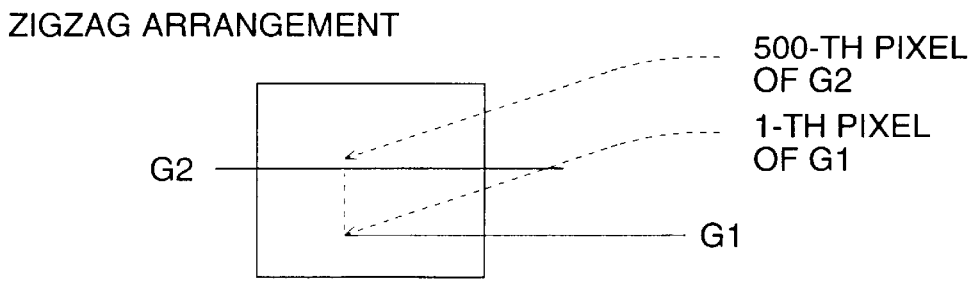

Adjustment of a position to start emitting is establishment in the case of actual image outputting as shown in FIG. 27(*c*), and when plural exposure heads R1, R2, G1, G2, B1 and B2 are arranged, the adjustment mentioned above means establishment of where to place image data on an exposure head such as 10th pixel for exposure head R1, 12th pixel for exposure head R2, 80th pixel for exposure head G2 and 85th pixel for exposure head B2.

When the amount of deviation stated above is 80 pixels in the case where exposure heads G2 and G1 are arranged in staggered fashion as shown in FIG. 27(*d*), image data of the first pixel of exposure head G1 are established so that they come to those of (500−80)=420th pixel as image data, because they become the same data as those of 500th pixel of exposure head G2.

(4) Adjustment of a position to start staggered inclination for two VFPH heads

Figure 12:
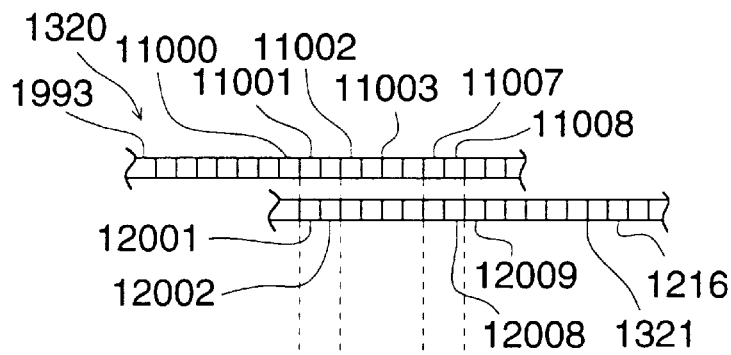
FIGS. 12(a) to 12(d) are diagrams illustrating how to establish an inclination coefficient.
Figure 12:
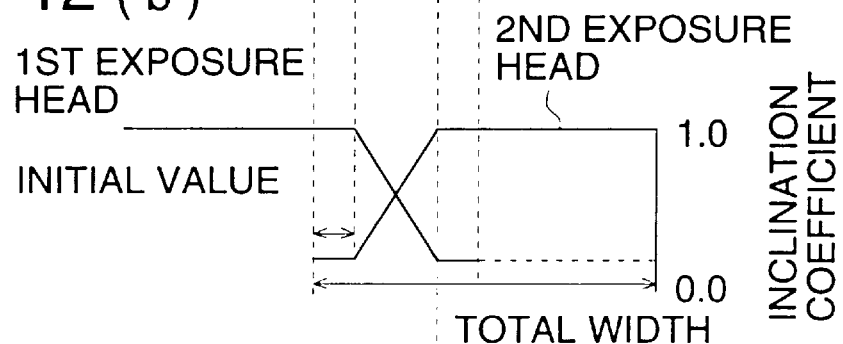
Figure 12:
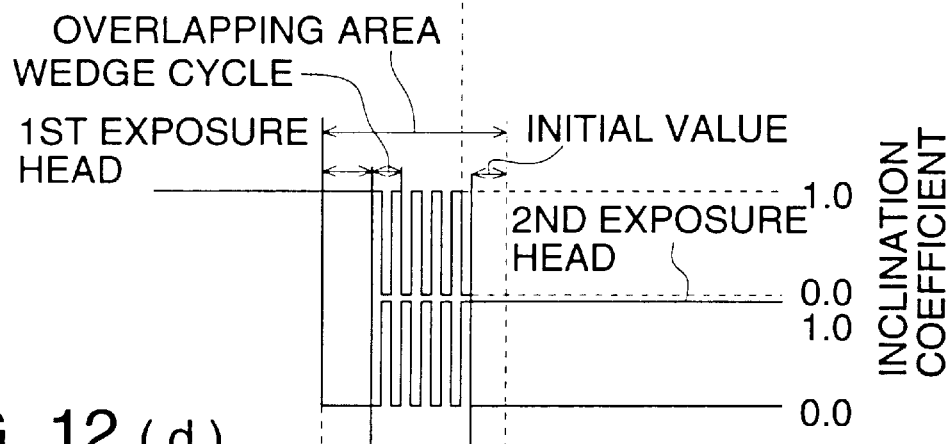
Figure 12:
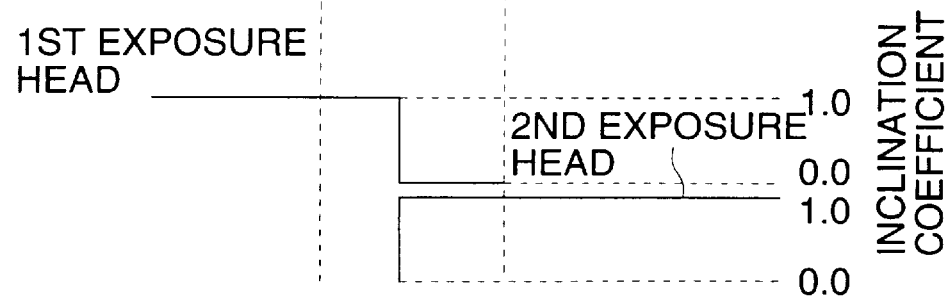

In this adjustment where an inclination is given (not in on/off fashion shown in FIG. 12(*d*)), deviation corresponding to several pixels is allowed because it does not matter in the sense of vision.

(5) Adjustment of emission unit time

When plural exposure heads are conveyed by plural conveyance means, the conveyance speed of each conveyance means sometimes differs from others and positional deviation is sometimes caused if exposure and recording are conducted without taking any actions. To prevent this problem, the writing timing based on exposure which matches each conveyance means is used. This is meant by the adjustment of emission unit time.

With regard to (1) Correction of a quantity of light of a pixel, (3) Adjustment of a position to start recording, (4) Adjustment of a position to start staggered inclination for two VFPH heads and (5) Adjustment of emission unit time, they may be conducted in any order. However, (2) Adjustment of a quantity of light between exposure heads is conducted after (1) Correction of a quantity of light of a pixel, and adjustment of a quantity of light between exposure heads is conducted after correction of a quantity of light of a pixel.

In general, a distance from a reference hole or a reference plane on an exposure head to the position of a pixel which actually emits light has a mechanical tolerance of 50 μm −1 mm due to a manufacturing method of an exposure head. On the other hand, when forming an image whose edge portion contains much high spatial frequency components like a black letter, for example, by giving exposure on a color light-sensitive material with several light sources, positions of exposures conducted by the light sources need to agree with each other exactly. It is therefore necessary for the mechanical tolerance mentioned above to be adjusted by some means or other.

When using plural exposure heads as in the foregoing, therefore, there is conducted inspection assembly to adjust relative positions between exposure heads and focused points in advance, which is fixed in one exposure unit. Then, the exposure head is mounted at the standard position on the exposure unit. Such unitization of the exposure head makes it possible to mount or replace an exposure head through no complicated adjustment work. Furthermore, if the exposure head is fixed on the exposure unit by means of adhesives or the like, the exposure head and the exposure unit are united perfectly, namely, a relative position for each exposure head becomes constant, and deviation of the relative position caused by the mounting work or by external vibrations can be prevented, which is preferable.

When a mechanism to correct warpage of an exposure head is attached in an exposure unit, a yield factor for the exposure head is improved, which is further preferable.

Parameters necessary to set up an exposure section such as an amount of image shifting to be established when setting up an exposure unit on the present outputting equipment, LUT data for LUT conversion processing, and data of correction between pixels, are obtained in advance to be stored in a flexible recording medium such as a floppy disk capable of reading mechanically, and are delivered together with the exposure unit. Then, when setting up the exposure unit on the present outputting equipment, a flexible storage medium such as a floppy disk capable of reading mechanically which corresponds to the aforesaid exposure unit is read mechanically by a mechanical reading unit of the present apparatus, whereby, parameters necessary to set up an exposure section such as an amount of image shifting to be established when setting up an exposure unit on the present outputting equipment, LUT data for LUT conversion processing, and data of correction between pixels, are set. Due to this, it is possible to increase the efficiency of setting up sharply.

When using a light-sensitive material sensitive to wavelengths ranging from visible rays to infrared rays shown in another embodiment in the present specification, the same effect was obtained by adjusting using light sources each having a wavelength corresponding to each of color forming layers for yellow, magenta and cyan and by conducting the same correction. Though a light-sensitive material for images for correction may be different from that for actual image forming, it is preferable to use the same light-sensitive material, because the correction including characteristics of the light-sensitive material can be make.

The present invention makes it possible to adjust an apparatus which can record images with high image quality in a simple manner.

What is claimed is:

1. A method of adjusting an image recording apparatus, comprising the steps of:

adjusting at least one of a focus point position of an exposure means, a degree of parallelization of the exposure means and a position of the exposure means; and correcting a light amount of the exposure means after the adjusting step, the adjusting step sequentially adjusting at least one of the degree of parallelization of the exposure means and the position of the exposure means and adjusting the focus point position of the exposure means.

2. The method of claim 1, wherein the exposure means comprises a plurality of exposure heads and the step of adjusting the degree of parallelization of the exposure means is a step of adjusting the degree of parallelization among the plurality of exposure heads.

3. The method of claim 2, wherein each of the plurality of exposure heads comprises a plurality of light emitting elements aligned in a single line or plural lines and the step of adjusting the position of the exposure means is a step of adjusting positional deviations in the alignment of the light emitting elements among the plurality of exposure heads.

4. A method of adjusting an image recording apparatus, comprising the steps of:

adjusting at least one of a focus point position of an exposure means, a degree of parallelization of the exposure means and a position of the exposure means; and correcting a light amount of the exposure means after the adjusting step, wherein the exposure means comprises a plurality of exposure heads, and the method further comprises steps of:

adjusting a difference in light amount among the plurality of exposure heads after the step of correcting the light amount of the exposure means, wherein the step of correcting the light amount of the exposure means is a step of correcting the light amount of each of the plurality of exposure heads.

5. The method of claim 1, further comprising a step of adjusting an exposure start position of the exposure means after the step of adjusting the focus point position.

6. A method of adjusting an image recording apparatus, comprising steps of:

adjusting at least one of a focus point position of an exposure means, a degree of parallelization of the exposure means and a position of the exposure means; and correcting a light amount of the exposure means after the adjusting step, wherein the step of correcting the light amount of the exposure means conducts adjusting a light emitting time of the exposure means.

7. The method of claim 4, wherein the step of correcting the light amount of the exposure means comprises steps of exposing a test pattern on a silver halide photographic light sensitive material by the exposure means;

developing the silver halide photographic light sensitive material exposed with the test pattern; and correcting light amount of the exposure means on the basis of the test pattern on the developed silver halide photographic light sensitive material.

* * * * *